US012647680B2

(12) United States Patent
Ikeno et al.

(10) Patent No.: US 12,647,680 B2
(45) Date of Patent: Jun. 2, 2026

(54) IMAGING APPARATUS AND CONTROL METHOD FOR IMPROVING USABILITY IN IMAGE CAPTURE

(71) Applicant: SONY GROUP CORPORATION, Tokyo (JP)

(72) Inventors: Asuka Ikeno, Tokyo (JP); Mayuko Sato, Tokyo (JP); Sumino Sato, Tokyo (JP); Yuki Murata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/712,071

(22) PCT Filed: Nov. 15, 2022

(86) PCT No.: PCT/JP2022/042324
§ 371 (c)(1),
(2) Date: May 21, 2024

(87) PCT Pub. No.: WO2023/100641
PCT Pub. Date: Jun. 8, 2023

(65) Prior Publication Data
US 2025/0024143 A1     Jan. 16, 2025

(30) Foreign Application Priority Data
Nov. 30, 2021     (JP) ................................. 2021-193787

(51) Int. Cl.
*H04N 23/667*          (2023.01)
*H04N 5/76*            (2006.01)
(Continued)

(52) U.S. Cl.
CPC ............. *H04N 23/667* (2023.01); *H04N 5/76* (2013.01); *H04N 23/62* (2023.01); *H04N 23/634* (2023.01); *H04N 23/65* (2023.01)

(58) Field of Classification Search
CPC .. H04N 23/667; H04N 23/634; H04N 23/631; H04N 23/65; H04N 23/62; H04N 5/76; G03B 17/16
See application file for complete search history.

(56) References Cited

U.S. PATENT DOCUMENTS

2016/0205340 A1*  7/2016  Jang ................... H04N 21/4786
                                              348/14.02
2016/0241783 A1*  8/2016  Fukui ..................... H04N 23/62
                            (Continued)

FOREIGN PATENT DOCUMENTS

JP        10-228688 A      8/1998
JP        2005-198026 A    7/2005
                (Continued)

OTHER PUBLICATIONS

International Search Report and Written Opinion of PCT Application No. PCT/JP2022/042324, issued on Jan. 17, 2023, 08 pages of ISRWO.

*Primary Examiner* — Kelly L Jerabek
(74) *Attorney, Agent, or Firm* — CHIP LAW GROUP

(57) ABSTRACT

Provided is an imaging apparatus that includes a control unit that causes recording of moving image capture mode information that indicates a moving image capture mode last used before power-off of the imaging apparatus, and causes power-on of the imaging apparatus when a predetermined operation is performed while the imaging apparatus is in a power-off state, and makes a setting to the moving image capture mode indicated by the moving image capture mode information upon activation of a function to start capturing a moving image or after termination of capturing of the moving image due to the activation of the function.

14 Claims, 30 Drawing Sheets

(51) Int. Cl.
    *H04N 23/62*      (2023.01)
    *H04N 23/63*      (2023.01)
    *H04N 23/65*      (2023.01)

(56)            References Cited

U.S. PATENT DOCUMENTS

| 2017/0013237 | A1* | 1/2017 | Ito ........................... B61D 1/00 |
| 2018/0027182 | A1* | 1/2018 | Takahashi ............. G03B 17/00 |
| | | | 348/372 |

FOREIGN PATENT DOCUMENTS

| JP | 2018-023086 A | 2/2018 |
| JP | 2018-082331 A | 5/2018 |

* cited by examiner

| IMAGE CAPTURE MODE WHEN POWER WAS TURNED off | IMAGE CAPTURE MODE USING SINGLE-STEP REC |
|---|---|
| STILL IMAGE MODE | FOLLOW MODE WHEN POWER WAS TURNED off (IMAGE CAPTURE MODE USING DIRECT REC) |
| MOVING IMAGE MODE | FOLLOW MODE WHEN POWER WAS TURNED off |
| S&Q MODE | FOLLOW MODE WHEN POWER WAS TURNED off |

*FIG. 4*

| IMAGE CAPTURE MODE WHEN POWER WAS TURNED off | IMAGE CAPTURE MODE USING SINGLE-STEP REC |
|---|---|
| STILL IMAGE MODE | FOLLOW MODE WHEN POWER WAS TURNED off (IMAGE CAPTURE MODE USING DIRECT REC) |
| MOVING IMAGE MODE | FOLLOW MODE WHEN POWER WAS TURNED off |
| S&Q MODE | MOVING IMAGE MODE |

*FIG. 5*

| IMAGE CAPTURE MODE WHEN POWER WAS TURNED off | IMAGE CAPTURE MODE USING SINGLE-STEP REC |
|---|---|
| STILL IMAGE MODE | MOVING IMAGE MODE |
| MOVING IMAGE MODE | MOVING IMAGE MODE |
| S&Q MODE | MOVING IMAGE MODE |

Figure 8:
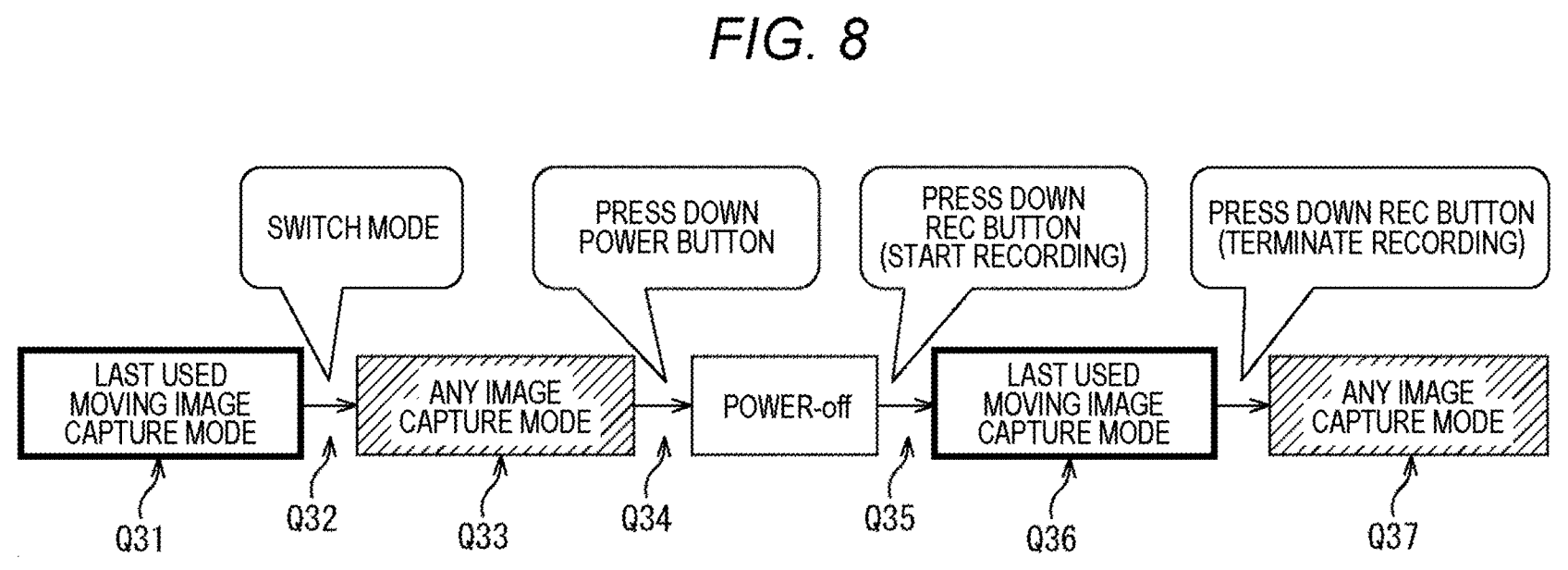

LAST USED MOVING IMAGE CAPTURE MODE    Q31

SWITCH MODE

ANY IMAGE CAPTURE MODE    Q32    Q33

PRESS DOWN POWER BUTTON

POWER-off    Q34    Q35

PRESS DOWN REC BUTTON (START RECORDING)

LAST USED MOVING IMAGE CAPTURE MODE    Q36

PRESS DOWN REC BUTTON (TERMINATE RECORDING)

ANY IMAGE CAPTURE MODE    Q37

*FIG. 9*

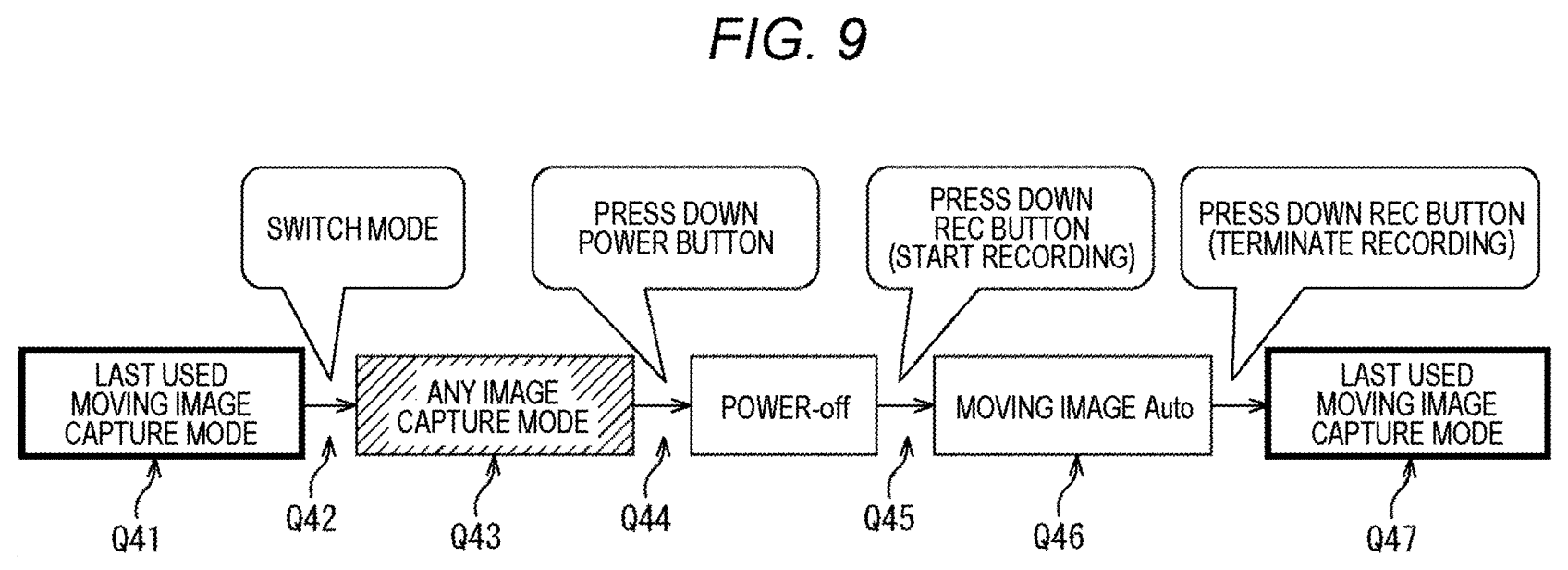

LAST USED MOVING IMAGE CAPTURE MODE — Q41

SWITCH MODE

ANY IMAGE CAPTURE MODE — Q43    Q42

PRESS DOWN POWER BUTTON

POWER-off — Q44

PRESS DOWN REC BUTTON (START RECORDING)

MOVING IMAGE Auto — Q46    Q45

PRESS DOWN REC BUTTON (TERMINATE RECORDING)

LAST USED MOVING IMAGE CAPTURE MODE — Q47

Figure 16:
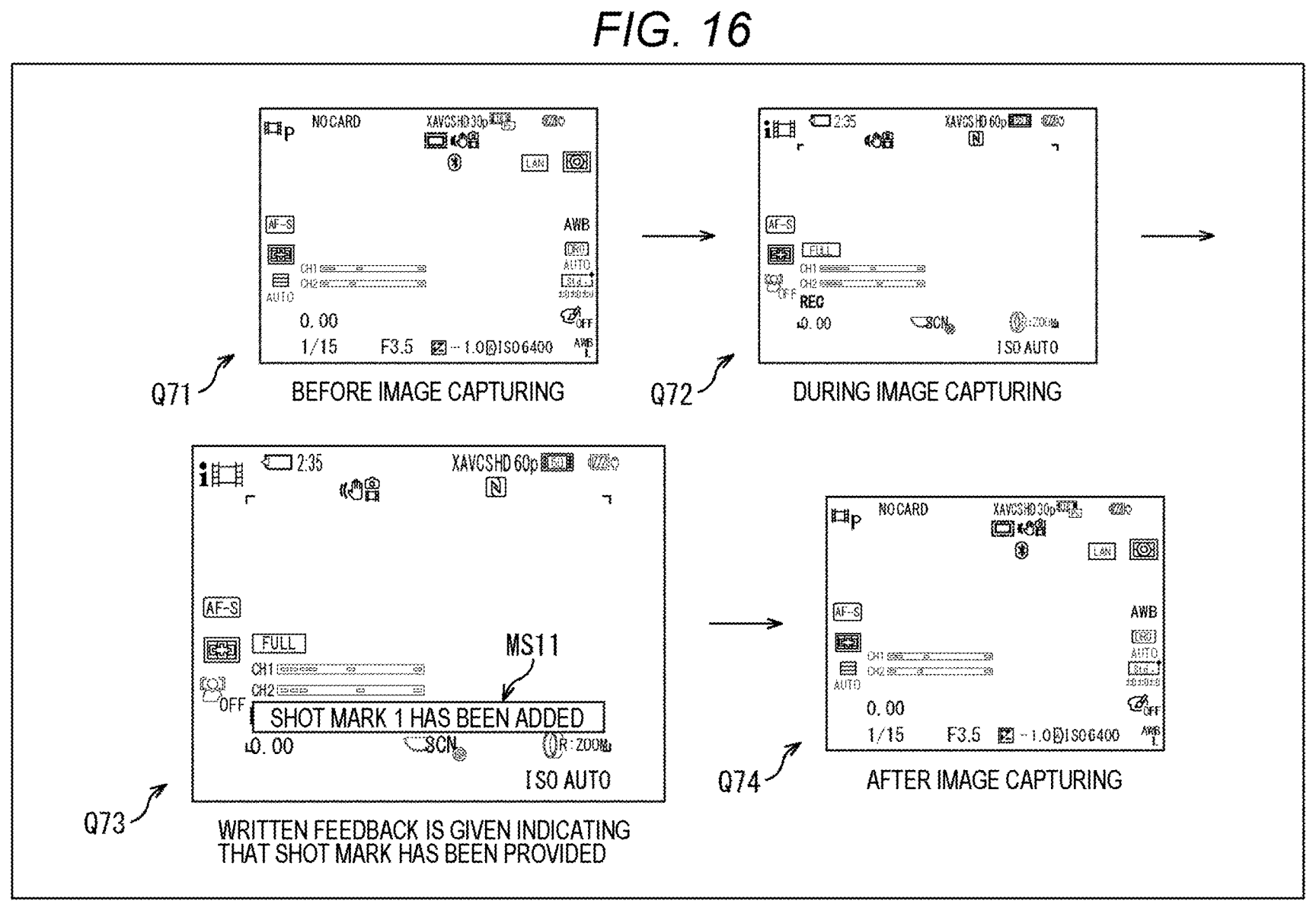

BEFORE IMAGE CAPTURING

Q71

DURING IMAGE CAPTURING

Q72

AFTER IMAGE CAPTURING

Q74

MS11

SHOT MARK 1 HAS BEEN ADDED

WRITTEN FEEDBACK IS GIVEN INDICATING
THAT SHOT MARK HAS BEEN PROVIDED

Figure 17:
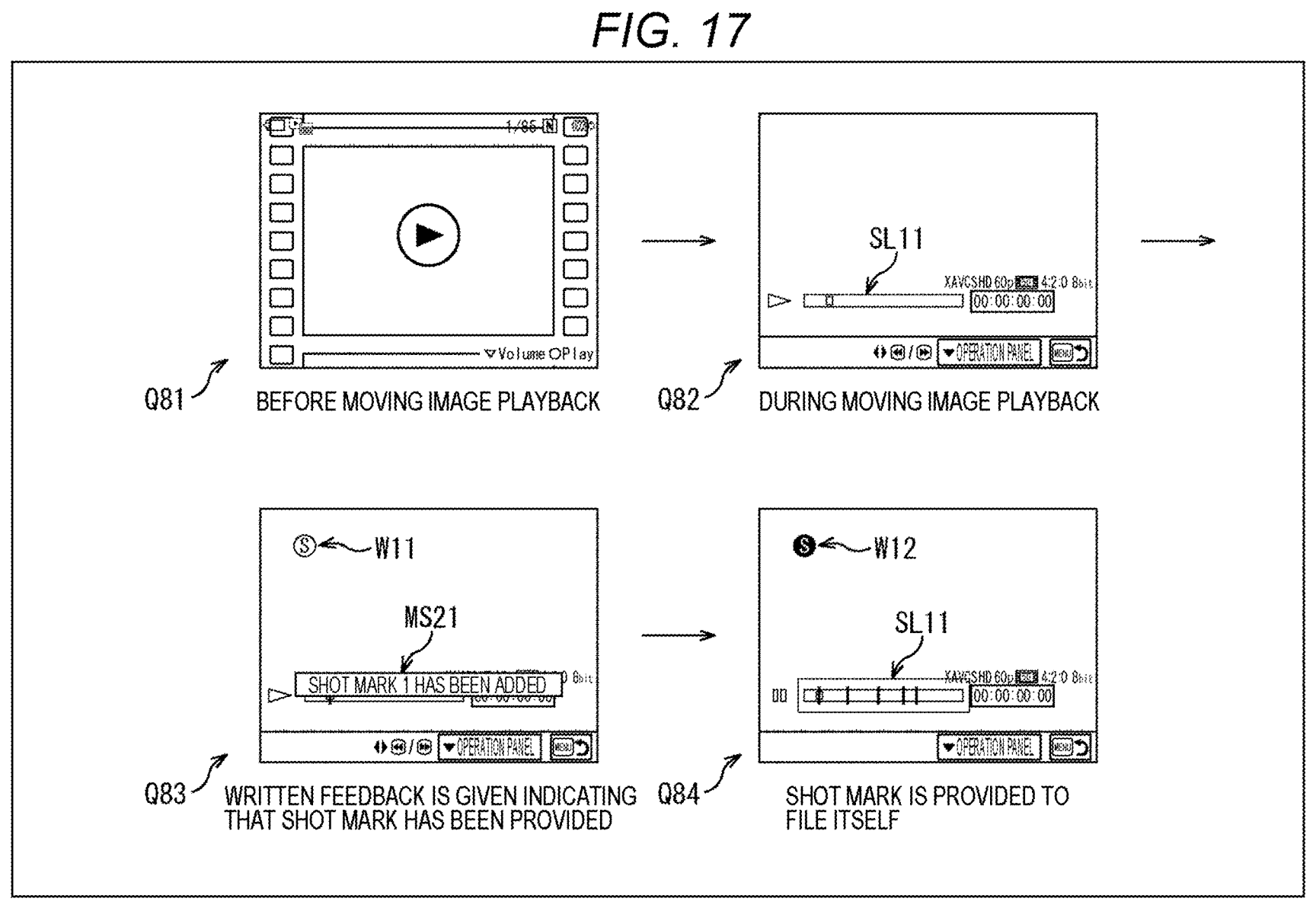

BEFORE MOVING IMAGE PLAYBACK

Q81

DURING MOVING IMAGE PLAYBACK

Q82

W11

MS21

SHOT MARK 1 HAS BEEN ADDED

WRITTEN FEEDBACK IS GIVEN INDICATING
THAT SHOT MARK HAS BEEN PROVIDED

Q83

W12

SL11

SHOT MARK IS PROVIDED TO
FILE ITSELF

| CAMERA BODY | APPLICATION | WILL MOVING IMAGE WITH SHOT MARKS BE CUT? |
|---|---|---|
| SUPPORT PARTIAL TRANSFER | SUPPORT PARTIAL TRANSFER | CUT |
| SUPPORT PARTIAL TRANSFER | NOT SUPPORT PARTIAL TRANSFER | NOT CUT |
| NOT SUPPORT PARTIAL TRANSFER | SUPPORT PARTIAL TRANSFER | NOT CUT |
| NOT SUPPORT PARTIAL TRANSFER | NOT SUPPORT PARTIAL TRANSFER | NOT CUT |

1

IMAGING APPARATUS AND CONTROL METHOD FOR IMPROVING USABILITY IN IMAGE CAPTURE

CROSS REFERENCE TO RELATED APPLICATIONS

This application is a U.S. National Phase of International Patent Application No. PCT/JP2022/042324 filed on Nov. 15, 2022, which claims priority benefit of Japanese Patent Application No. JP 2021-193787 filed in the Japan Patent Office on Nov. 30, 2021. Each of the above-referenced applications is hereby incorporated herein by reference in its entirety.

TECHNICAL FIELD

The present technology relates to an imaging apparatus, a control method, and a program, and more particularly, to an imaging apparatus, a control method, and a program capable of improving usability.

BACKGROUND ART

Conventionally, various functions are mounted in imaging apparatuses, and users capture moving images and still images while appropriately using these functions.

For example, as a technology related to the function of an imaging apparatus, a technology has been proposed in which a recording button of a camera is pressed for a certain period of time or longer to start power supply, and then the recording button is operated to shift to starting or stopping camera recording (e.g., see Patent Document 1).

CITATION LIST

Patent Document

Patent Document 1: Japanese Patent Application Laid-Open No. 10-228688

SUMMARY OF THE INVENTION

Problems to be Solved by the Invention

Recently, users have been actively posting moving images captured by imaging apparatuses such as digital video cameras and smartphones on moving image posting sites, social networking services (SNS), and the like.

Therefore, there is a demand for functions to improve the usability of imaging apparatuses, such as functions to prevent the missing of image capturing opportunities.

The present technology has been made in view of such a situation, and is intended to improve usability.

Solutions to Problems

An imaging apparatus according to one aspect of the present technology is an imaging apparatus including a control unit. The control unit causes recording of moving image capture mode information that indicates a moving image capture mode last used before power-off of the imaging apparatus. The control unit causes power-on of the imaging apparatus when a predetermined operation is performed while the imaging apparatus is in a power-off state, and makes a setting to the moving image capture mode indicated by the moving image capture mode information upon activation of a function to start capturing a moving image or after termination of capturing of the moving image due to the activation of the function.

A control method or a program according to one aspect of the present technology includes the steps of: causing recording of moving image capture mode information that indicates a moving image capture mode last used before power-off of the imaging apparatus; and causing power-on of the imaging apparatus when a predetermined operation is performed while the imaging apparatus is in a power-off state, and making a setting to the moving image capture mode indicated by the moving image capture mode information upon activation of a function to start capturing a moving image or after termination of capturing of the moving image due to the activation of the function.

In one aspect of the present technology, the following is performed: causing the recording of moving image capture mode information that indicates a moving image capture mode last used before power-off of the imaging apparatus; and causing the power-on of the imaging apparatus when a predetermined operation is performed while the imaging apparatus is in a power-off state, and making a setting to the moving image capture mode indicated by the moving image capture mode information upon activation of a function to start capturing a moving image or after termination of capturing of the moving image due to the activation of the function.

BRIEF DESCRIPTION OF DRAWINGS

FIG. 2 is a diagram illustrating a functional configuration example of an imaging apparatus.

FIG. 3 is a diagram for explaining an example of an activation pattern of a single-step REC.

FIG. 4 is a diagram for explaining an example of an activation pattern of a single-step REC.

FIG. 5 is a diagram for explaining an example of the activation pattern of the single-step REC.

FIG. 6 is a diagram for explaining a transition example of the image capture mode.

FIG. 8 is a diagram for explaining a transition example of the image capture mode.

FIG. 9 is a diagram for explaining a transition example of the image capture mode.

FIG. 14 is a diagram for explaining the depth switching.

FIG. 16 is a diagram for explaining the provision of a shot mark during image capturing.

FIG. 17 is a diagram for explaining the provision of a shot mark during playback.

FIG. 24 is a diagram for explaining behavior when a moving image is retrieved.

MODE FOR CARRYING OUT THE INVENTION

In the following, embodiments to which the present technology is applied will be described with reference to the drawings.

First Embodiment

<External Configuration Example of Imaging Apparatus>

Figure 1:
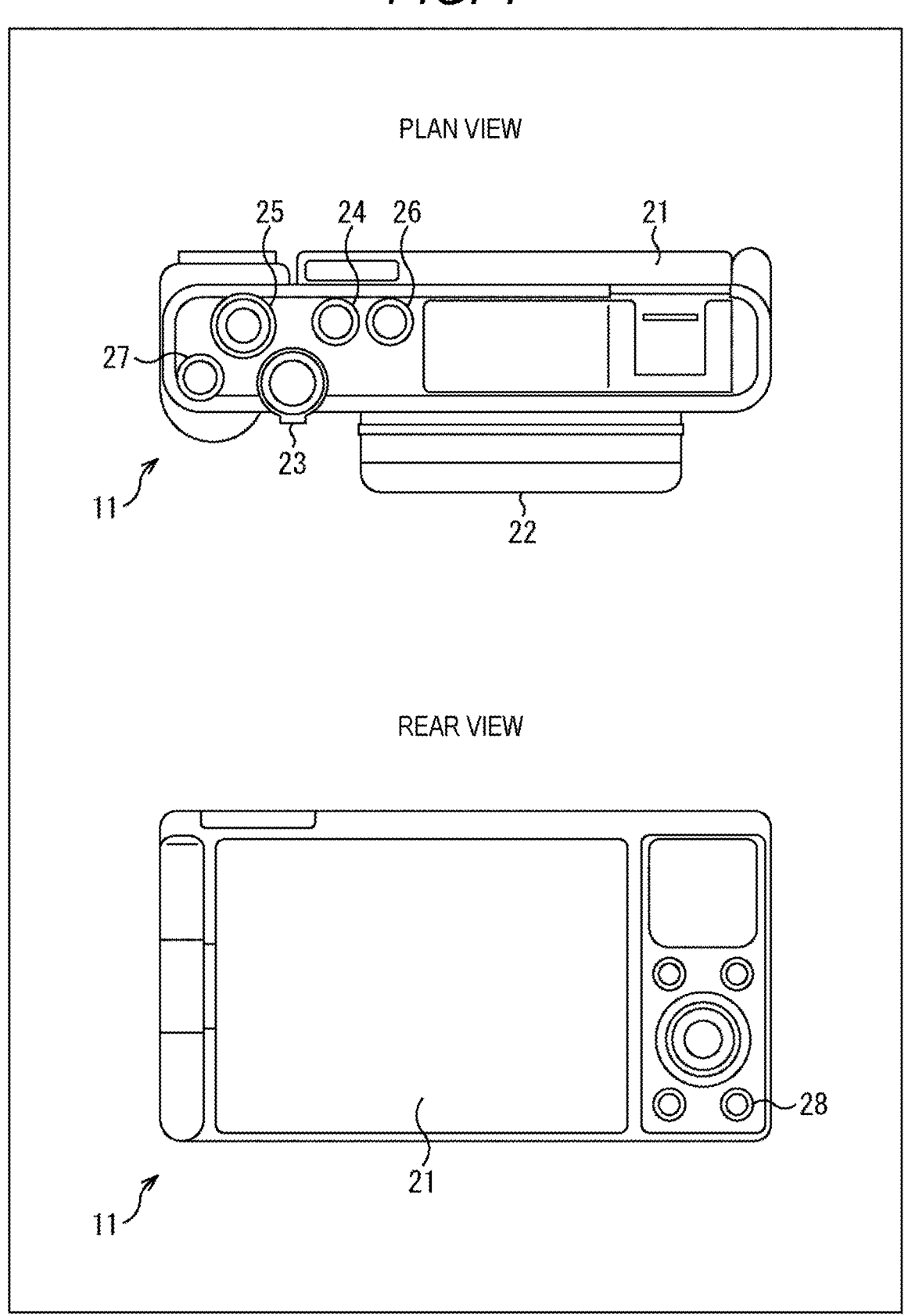
FIG. 1 is a diagram illustrating an external configuration example of an imaging apparatus.

FIG. 1 is a diagram illustrating a configuration example of the appearance of an imaging apparatus to which the present technology is applied.

An imaging apparatus 11 illustrated in FIG. 1 includes, for example, a digital camera, and can capture a still image and a moving image.

Note that the imaging apparatus 11 may be a smartphone, a tablet, or the like having an image capture function, but in the following description, it is assumed that the imaging apparatus 11 is a digital camera.

In FIG. 1, a plan view of the imaging apparatus 11 is illustrated on the upper side in the figure, and a rear view of the imaging apparatus 11 is illustrated on the lower side in the figure.

On the back side of the imaging apparatus 11, a display panel 21 including a display device such as a liquid crystal display or an organic electro-luminescence (EL) display is provided.

For example, a user can capture an image while checking a through-image (subject monitoring image) or the like displayed on the display panel 21, and can cause a captured still image or moving image to be displayed on the display panel 21 and check the image. In addition, a setting screen for various settings and the like are also displayed on the display panel 21.

A lens unit 22 that guides light from a subject to an imaging element (not illustrated) is provided on the front side (subject side) of the imaging apparatus 11. Note that the lens unit 22 may be integrated with the housing of the imaging apparatus 11 or may be detachable from the housing.

A shutter button 23, a mode button 24, a REC button 25, a power button 26, and a custom button 27 are provided on the upper surface of the housing of the imaging apparatus 11. Similarly, a plurality of buttons including a custom button 28 is also provided on the right side in the figure of the display panel 21 on the back surface of the imaging apparatus 11.

The shutter button 23 is operated when a still image is captured, and the mode button is operated when various modes such as an image capture mode are switched.

The REC button 25 is a recording button (movie button), and is operated when the capturing of a moving image is started or when the capturing of a moving image is terminated. The power button 26 is operated when the power of the imaging apparatus 11 is turned on or off.

Each of the custom button 27 and the custom button 28 is a button also called an assignable button, to which a predetermined operation function has been assigned in an initial state and to which the user can assign any operation function.

In addition to the buttons such as the shutter button 23, various operation units such as a switch, a key, a dial, and a combined press/rotation operator may be appropriately provided in the imaging apparatus 11. By operating these operation units, it is possible to perform, for example, a menu operation, a playback operation, a mode selection operation, a focus operation, a zoom operation, and a parameter selection operation for a shutter speed, an F value, and the like.

<Functional Configuration Example of Imaging Apparatus>

Figure 2:
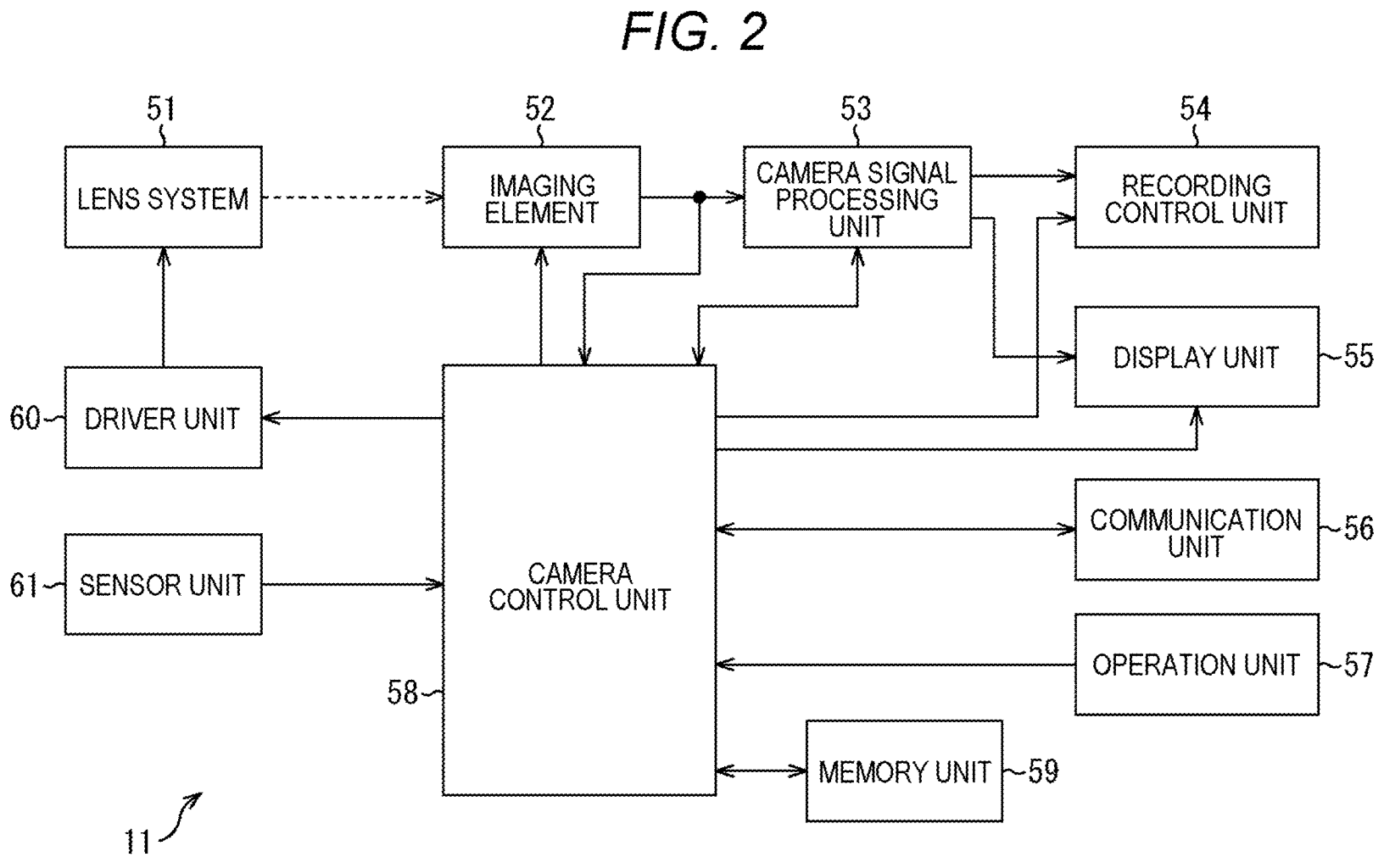

FIG. 2 is a diagram illustrating a functional configuration example of the imaging apparatus 11.

In the example of FIG. 2, the imaging apparatus 11 includes a lens system 51, an imaging element 52, a camera signal processing unit 53, a recording control unit 54, a display unit 55, a communication unit 56, an operation unit 57, a camera control unit 58, a memory unit 59, a driver unit 60, and a sensor unit 61.

The lens system 51 is provided in the lens unit 22 and includes lenses such as a zoom lens and a focus lens, an aperture mechanism, and the like. The lens system 51 condenses light (incident light) incident from the subject and guides the light onto an imaging surface of the imaging element 52.

The imaging element 52 includes, for example, a complementary-metal oxide semiconductor (CMOS) image sensor, a charge-coupled device (CCD) image sensor, or the like.

The imaging element 52 photoelectrically converts light incident from the subject via the lens system 51 to image the subject, and supplies image data obtained as a result to the camera signal processing unit 53 and the camera control unit 58. That is, the imaging element 52 captures a still image or a moving image. Note that in a case where there is no particular need to distinguish between a still image and a moving image, these images will hereinafter be referred to simply as images.

The camera signal processing unit 53 includes, for example, an image processing processor such as a digital signal processor (DSP). The camera signal processing unit 53 performs various types of signal processing such as demosaic processing, white balance adjustment processing, and compression encoding processing on the image data supplied from the imaging element 52, and supplies the image data after the signal processing to the recording control unit 54, the display unit 55, the camera control unit 58, and the like.

The recording control unit 54 supplies image data of a still image or a moving image supplied from the camera signal processing unit 53, metadata of the image data supplied from the camera control unit 58, or the like to a recording medium (not illustrated) to record the image data or the metadata, or reads the image data or the metadata from the recording medium.

Note that the recording medium on which the image data and the metadata are recorded may be detachable from the imaging apparatus 11 or may be built in the imaging apparatus 11.

The display unit 55 includes, for example, the display panel 21 described above, a viewfinder, and the like, and displays various images.

For example, the display unit 55 displays a through-image on the basis of image data supplied from the camera signal processing unit 53 at the time of image capturing, or displays various screens such as a still image, a moving image, and a setting screen under the control of the camera control unit 58.

The communication unit 56 communicates with an external apparatus via a wired or wireless network. The communication performed by the communication unit 56 may be any type of communication, for example, communication via the Internet, short-range wireless communication such as Bluetooth (registered trademark), Wi-Fi (registered trademark) communication, near field communication (NFC), or the like.

The operation unit 57 includes, for example, buttons such as the shutter button 23 through the custom button 28, a switch, a key, a dial, a combined pressing/rotation operator, a touch panel provided to be superimposed on the display panel 21, and the like, and supplies a signal corresponding to the user's operation to the camera control unit 58.

The camera control unit 58 includes, for example, a central processing unit (CPU), and controls the entire operation of the imaging apparatus 11.

For example, the camera control unit 58 performs focus control, aperture adjustment, exposure control, shutter speed control, mode setting, and the like according to signals from the operation unit 57, image data from the imaging element 52 or the camera signal processing unit 53, and sensor information from the sensor unit 61.

The memory unit 59 records, for example, a program executed by the camera control unit 58, information regarding various settings supplied from the camera control unit 58, and the like. In addition, the memory unit 59 may be used as a work area when the camera control unit 58 performs various types of processing.

The driver unit 60 includes, for example, a motor driver, and realizes zoom, focus control, aperture adjustment, and the like by driving a motor that drives the lens and the aperture mechanism constituting the lens system 51 under the control of the camera control unit 58.

The sensor unit 61 includes, for example, at least one of an inertial measurement unit (IMU), a position information sensor, a distance measurement sensor, and an illuminance sensor.

The sensor unit 61 supplies IMU information, which is measurement results of acceleration, angular velocity, or the like, position information, which is a measurement result of a position, distance information, which is a distance measurement result, illuminance information, which is a measurement result of illuminance, and other information to the camera control unit 58 as sensor information indicating results of sensing by the sensor unit 61.

<Image Capture Mode>

Meanwhile, by operating the operation unit 57 such as the mode button 24 provided in the imaging apparatus 11, the user can switch the image capture mode, which is a mode when the imaging apparatus 11 performs image capturing.

For example, the image capture mode includes the following three modes, and the user can select any one of these three modes.

(Image Capture Mode)
Still image mode
Moving image mode
S&Q mode

The still image mode is a mode for capturing a still image, the moving image mode is a mode for capturing a moving image, and the S&Q mode (slow & quick motion mode) is a mode for capturing a variable speed moving image.

In the moving image mode, a moving image is captured and recorded at a predetermined reference frame rate. The reference frame rate is, for example, a frame rate for 1×speed moving image recording generally adopted for capturing a moving image with a camera, such as 30 frames per second (fps), and a so-called 1×—speed normal moving image can be obtained by image capturing in the moving image mode.

The S&Q mode is a mode in which a moving image is captured at a frame rate different from the reference frame rate.

In particular, in the S&Q mode, the user can either capture a moving image at a frame rate lower than the reference frame rate (slow motion image capturing) or capture a moving image at a frame rate higher than the reference frame rate (quick motion image capturing).

Furthermore, the moving image mode includes, for example, the following six modes, and the user can select any one of these six modes. In other words, the moving image mode is a mode in which a moving image is captured among a plurality of (here, six) modes described below. In each of the moving image mode, image capturing setting values when a moving image is captured are set (determined) by specification by the user, calculation by the camera control unit 58, or the like. For example, the image capturing setting values include five parameters shown below.

(Moving Image Mode)
Eye auto mode
Blur-priority auto mode
P mode
A-mode
S mode
M mode (Image Capturing Setting Value)
Exposure correction value
Shutter speed
F value (aperture value)
International organization for standardization (ISO) sensitivity
White balance setting value (white balance gain)

For example, in the eye auto mode, all the parameters of the image capturing setting values are automatically set (determined) by the camera control unit 58 on the basis of an image captured by the imaging element 52, illuminance information obtained by the sensor unit 61, and the like. At this time, for example, scene recognition based on the image may be performed, and the image capturing setting values may be determined on the basis of the result of the scene recognition or the like.

Furthermore, for example, in the eye auto mode, the user cannot specify any parameter of the image capturing setting value, and the user cannot specify a creative look or a picture effect.

For example, in the creative look, the user can select a preset filter or finely adjust parameters of the filter such as contrast, saturation, clarity, sharpness, and shadow, thereby obtaining an image with a desired color tone and texture. In a case where the specification of a desired filter (including parameter adjustment) is performed as the creative look, the camera signal processing unit 53 performs filtering on the image data based on the specified filter.

In the picture effect, the user can select a filter of an effect prepared in advance, such as a toy camera or a pop color, and apply the selected effect to the captured image. In a case where a desired effect is specified as the picture effect, the camera signal processing unit 53 performs filtering on the image data based on the filter of the specified effect.

The blur-priority auto mode is, for example, a mode in which control prioritizing blur is performed based on a P mode to be described later. In the blur-priority auto mode, for example, on the basis of the image captured by the imaging element 52, the illuminance information obtained by the sensor unit 61, and the like, basically, all the parameters of the image capturing setting values are automatically determined by the camera control unit 58 so that the F value becomes as small as possible within a range in which the picture of the image does not fail.

In other words, in the blur-priority auto mode, for example, the image capturing setting values are determined such that each parameter of the image capturing setting value satisfies a predetermined condition and the F value is as small as possible. Note that, for example, in a case where a specific setting is made by the user, the F value in the blur-priority auto mode may be set to a predetermined fixed value.

At this time, similarly to the case of the eye auto mode, the image capturing setting values may be determined on the basis of the scene recognition result. Furthermore, in the blur-priority auto mode, for example, the user can specify the exposure correction value among the image capturing setting values (parameters other than the exposure correction value cannot be specified), and the user can also specify the creative look and the picture effect.

In this way, in the blur-priority auto mode, the degree of freedom of the setting related to the video expression can be increased compared to the eye auto mode, and the video quality can be ensured by the automatic setting of the image capturing setting values.

Both the eye auto mode and the blur-priority auto mode described above are auto modes in which the camera control unit 58 sets at least some parameters constituting the image capturing setting values automatically (in auto), and a high-quality moving image can be obtained without the user needing to set (specify) any of the image capturing setting values. More specifically, the P mode, the A mode, and the S mode described below can also be regarded as one of the auto modes.

In the following, in a case where there is no particular need to distinguish between the eye auto mode and the blur-priority auto mode, each of these will also be referred to simply as the auto mode.

The P mode is a mode called program auto. In the P mode, at least the shutter speed and the F value among the image capturing setting values are automatically determined by the camera control unit 58 on the basis of, for example, a captured image and illuminance information. That is, in the P mode, the user can freely set the exposure correction value, the ISO sensitivity, and the white balance setting value among the image capturing setting values. Furthermore, in the P mode, the user can also specify the creative look and the picture effect.

The A mode is a mode called aperture priority auto. In the A mode, for example, at least the shutter speed of the image capturing setting value is automatically determined by the camera control unit 58 on the basis of a captured image, illuminance information, and the like, and at least the F value of the image capturing setting value is set (specified) by the user. Furthermore, in the A mode, the user can set the exposure correction value, the ISO sensitivity, and the white balance setting value among the image capturing setting values, and the user can also specify the creative look and the picture effect.

The S mode is a mode called a shutter speed priority mode. In the S mode, for example, at least the F value of the image capturing setting value is automatically determined by the camera control unit 58 on the basis of a captured image, illuminance information, and the like, and at least the shutter speed of the image capturing setting value is set (specified) by the user. Furthermore, in the S mode, the user can set the exposure correction value, the ISO sensitivity, and the white balance setting value among the image capturing setting values, and the user can also specify the creative look and the picture effect.

The M mode is a mode called a manual mode. In the M mode, at least the exposure correction value, the F value, and the shutter speed among the image capturing setting values are set (determined) by the user. Furthermore, in the M mode, the user can set the ISO sensitivity and the white balance setting value among the image capturing setting values, and the user can also specify the creative look and the picture effect.

Furthermore, in the following description, in particular, a case where the auto mode includes the eye auto mode and the blur-priority auto mode will be described, but the auto mode may be only the blur-priority auto mode.

Moreover, in the following description, modes such as the eye auto mode and the blur-priority auto mode in the moving image mode, that is, the type of the moving image mode is also particularly referred to as a moving image capture mode.

<Activation Pattern of Single-Step REC>

Furthermore, the imaging apparatus 11 is provided with, as a function for improving usability, a single-step REC function that is a function to turn on the power and start capturing a moving image when a predetermined operation is performed in a state where the power is off. That is, the single-step REC function is a function to start (turn on) the imaging apparatus 11 and start capturing a moving image when a predetermined operation is performed by the user from a state where the power of the imaging apparatus 11 is off.

Specifically, for example, in the single-step REC function, when the user instructs to start capturing a moving image by one predetermined operation from a state where the power of the imaging apparatus 11 is off, the imaging apparatus 11 is activated (the power of the imaging apparatus 11 is turned on) and the capturing of the moving image is started at the same time.

By providing such a single-step REC function, the user can immediately start capturing a moving image with a small number of operations.

Normally, the user presses the power button 26 to turn on the power of the imaging apparatus 11, checks that the imaging apparatus 11 has been activated (the power has been turned on), and then presses the REC button 25 to start capturing a moving image.

In contrast, when the single-step REC is activated, the user simply presses the REC button 25 to turn on the power, and start the capturing the moving image at the same time. Therefore, the user can start image capturing immediately upon wishing to start image capturing, whereby it is possible to reduce the chance of missing image capturing opportunities. The single-step REC is a function for taking a shortcut for a series of operations of instructing to start image capturing after the power is turned on.

Note that the single-step REC function is not limited to the operation (pressing down) on the REC button 25, and may be activated by, for example, an operation on a REC button provided on a remote controller connected to the imaging apparatus 11 in a wired or wireless manner, a REC button provided on a tripod electrically connected to the imaging apparatus 11, or the like.

Furthermore, usability can be further improved when the single-step REC is activated if the capturing of a moving image is started using an appropriate image capture mode and appropriate image capturing setting values.

Although several patterns are conceivable as to in which image capture mode image capturing is started when the single-step REC is activated, the following three activation patterns BP1 to BP3 are mainly conceivable.
(Activation Pattern BP1)

Activation is always performed in an image capture mode used when the power was turned off.
(Activation Pattern BP2)

Activation is performed basically in the image capture mode used when the power was turned off, but activation is performed in the moving image mode when the S&Q mode was used at the termination.
(Activation Pattern BP3)

Activation is performed in the moving image mode.

In the following, the activation patterns BP1 to BP3 will be further described with reference to FIGS. 3 to 5.

In the activation pattern BP1, as illustrated in FIG. 3, when the single-step REC is activated, image capturing is started using the same image capture mode and image capturing setting values as the image capture mode and image capturing setting values when the power was turned off last time. Therefore, the user can start image capturing in exactly the same state as the state (setting) immediately before the power was turned off. However, the image capturing setting value mentioned here is more specifically, for example, a parameter that can be specified by the user among the parameters constituting the image capturing setting values.

For example, when the user turns off the power of the imaging apparatus 11 while performing image capturing in the moving image mode, and then activates the single-step REC, the image capture mode is set to the moving image mode, and image capturing is performed in the moving image mode.

At this time, which mode (moving image capture mode is used for image capturing) among the moving image modes, that is, which moving image capture mode is set, is also determined according to the mode used when the power was turned off. Therefore, for example, when the power is turned off in the state of using the blur-priority auto mode among the moving image modes and then the single-step REC is activated, image capturing is performed in the blur-priority auto mode.

Similarly, when the user turns off the power of the imaging apparatus 11 while performing image capturing in the S&Q mode, and then activates the single-step REC, image capturing is performed in the S&Q mode.

In addition, the imaging apparatus 11 is provided with a direct REC function that is a function in which, when the user presses the REC button 25 while the image capture mode is the still image mode, the image capture mode is switched to the moving image mode, and the capturing of a moving image is started.

Therefore, in a case where the image capture mode at the time of turning off the power is the still image mode, when the single-step REC is activated, the direct REC function is assumed to be activated, and image capturing is performed in the moving image mode. This is because turning off the power in the still image mode and pressing the REC button 25 to activate the single-step REC is synonymous with operating the REC button 25 in the state of the still image mode to activate the direct REC.

The activation of the single-step REC in the activation pattern BP1 is the same as the activation pattern when the power button 26 is pressed to turn on the power of the imaging apparatus 11, which is the simplest specification.

Hence, the user can intuitively grasp the image capture mode used when the single-step REC is activated, thereby improving usability. In particular, in the activation pattern BP1, since the single-step REC function can also be used in the S&Q mode, the user can capture an image in his/her favorite image capture mode.

Furthermore, for example, the imaging apparatus 11 may be provided with a dial on which characters and marks representing the image capture mode or the moving image capture mode are printed. In such a case, the user selects the image capture mode or the moving image capture mode by turning the dial, that is, by changing the position of the dial.

In the activation pattern BP1, even in a case where such a dial for selecting the image capture mode or the moving image capture mode is provided, the image capture mode or the moving image capture mode used when the single-step REC is activated can be consistent with the image capture mode or the moving image capture mode indicated by the position of the dial. It is thus possible to prevent the user from misunderstanding the image capture mode or the like when the single-step REC is activated.

FIG. 4 illustrates a relationship between the image capture mode used when the power was turned off and the image capture mode used when the single-step REC is activated in the activation pattern BP2.

In the activation pattern BP2, basically, similarly to the activation pattern BP1, the activation is performed using the image capture mode and image capturing setting values when the power was turned off. However, in a case where the image capture mode used when the power was turned off is the S&Q mode, the activation is performed in the moving image mode.

Therefore, in the activation pattern BP2, regardless of which image capture mode is used when the power of the imaging apparatus 11 is turned off, the moving image mode is always used when the single-step REC is activated.

According to such an activation pattern BP2, in a case where it is desired to instantaneously start image capturing, it is possible to ensure that image capturing can always be started in the moving image mode.

In particular, in the activation pattern BP2, regardless of which image capture mode is used at the time of termination (power-off), a normal moving image, that is, a moving image in the moving image mode can be shot by activating the single-step REC. In addition, since the moving image mode is always used when the single-step REC is activated, the user does not need to memorize the image capture mode used when the power was turned off, leading to good usability even in the case of switching the mode in a tactile manner.

Note that switching the mode in a tactile manner is that the user operates the operation unit 57 to switch the image capture mode or the moving image capture mode on the setting screen (menu screen) displayed on the display unit 55.

FIG. 5 illustrates a relationship between the image capture mode used when the power was turned off and the image capture mode used when the single-step REC is activated in the activation pattern BP3.

In the activation pattern BP3, regardless of which image capture mode is used when the power of the imaging apparatus 11 is turned off, the moving image mode is always used when the single-step REC is activated. Thus, similarly to the case of the activation pattern BP2, the activation pattern BP3 can ensure that image capturing can always be started in the moving image mode in a case where it is desired to instantaneously start image capturing.

Note that, in the activation pattern BP3, the moving image mode is used when the single-step REC is activated, but there are several possible patterns as to which moving image capture mode in the moving image mode is used at this time. Which moving image capture mode is used when the single-step REC is activated in the moving image mode will be described later.

In the activation pattern BP3, for example, even in a case where the image capture mode used when the power was turned off is the moving image mode, the moving image capture mode in the moving image mode used when the single-step REC is activated is not necessarily the moving image capture mode used when the power was turned off.

The activation pattern BP3 as described above has a simple specification, and regardless of which image capture mode is used at the time of termination, an ordinary moving image (a moving image in the moving image mode) can be always captured, leading to good usability for the user. In addition, the user does not need to memorize the image capture mode used when the power was turned off, leading to good usability even in the case of switching the mode in a tactile manner.

As described above, in the case of turning off the power in the S&Q mode in the activation pattern BP2 or in the case of the activation pattern BP3, the moving image mode is used when the single-step REC is activated.

At this time, it is conceivable to adopt, for example, the eye auto mode, the blur-priority auto mode, or the last used moving image capture mode as the type of the moving image mode at the time of activation, that is, the moving image capture mode.

For example, in the single-step REC, if image capturing is always performed in the eye auto mode at the time of activation in the moving image mode, the image capturing setting value is determined by the imaging apparatus 11, so that a moving image with relatively high quality can be obtained. That is, the number of failures can be reduced.

Similarly, in the single-step REC, if image capturing is always performed in the blur-priority auto mode at the time of activating the moving image mode, the image capturing setting value is basically determined by the imaging apparatus 11, so that a moving image with relatively high quality can be obtained and the number of failures can be reduced.

Moreover, in the blur-priority auto mode, a blurred moving image, that is, a moving image with a shallow depth of field, can be obtained. Furthermore, in the blur-priority auto mode, the exposure correction value can be changed during image capturing, so that not only the number of failures can be reduced, but also a moving image reflecting the user's intention to some extent can be obtained.

Moreover, for example, when the single-step REC is activated in the moving image mode, if image capturing is performed in the moving image capture mode last used before the power was turned off, the image capturing can be performed with the setting desired by the user. Furthermore, in a case where image capturing is performed in the last used moving image capture mode, a value of a parameter that can be specified by the user among the parameters constituting the image capturing setting values when the moving image capture mode is last used may be used as it is, or a preset fixed value may be used as the value of the parameter.

For example, in a case where image capturing is performed in the same environment such as a case where the user performs image capturing with the same angle of view by using a tripod or the like, if image capturing is started in the moving image capture mode last used before the power was turned off, when the single-step REC is activated, it is convenient for the user to capture an image with the same settings (moving image capture mode, etc.).

In order to respond to the activation in the activation patterns BP1 to BP3 described above, the camera control unit 58 generates (updates) mode information, which is information regarding an image capture mode or the like at the time of image capturing at an appropriate timing, and records the mode information in the memory unit 59.

For example, the mode information includes power-off mode information and moving image capture mode information.

The power-off mode information includes information indicating an image capture mode that was used when the power of the imaging apparatus 11 was turned off (at the power-off), that is, an image capture mode last used before the power was turned off, and information indicating an image capturing setting value at the time of image capturing in the image capture mode.

Note that, more specifically, when the image capture mode indicated by the power-off mode information is the moving image mode, the information indicating the type of the moving image mode, that is, the moving image capture mode, is also included in the power-off mode information. Similarly, even if the image capture mode indicated by the power-off mode information is the still image mode or the S&Q mode, the power-off mode information includes information indicating the type of the still image mode or the S&Q mode (e.g., slow motion image capturing, etc.). Moreover, for example, when the mode is a mode in which the user cannot set the image capturing setting value, such as a case where the moving image capture mode used when the power was turned off is the eye auto mode, the information indicating the image capturing setting value is not included in the power-off mode information. In other words, the power-off mode information includes only the values of the parameters that can be specified by the user among the parameters constituting the image capturing setting values.

The moving image capture mode information includes information indicating a moving image capture mode last used before the power of the imaging apparatus 11 was turned off, and information indicating an image capturing setting value at the time of image capturing in the moving image capture mode. Note that, similarly to the case of the power-off mode information, in a case where the user cannot set the image capturing setting value, such as a case where the moving image capture mode is the eye auto mode, the moving image capture mode information does not include information indicating the image capturing setting value.

In addition, the power-off mode information and the moving image capture mode information may include information indicating the creative look or picture effect set, which was last set before the power was turned off.

Among the activation patterns BP1 to BP3, in particular, the activation pattern BP1 and the activation pattern BP2 can be said to be examples in which the camera control unit 58 determines the image capture mode used when the single-step REC is activated on the basis of the power-off mode information.

<Transition of Image Capture Mode>

In addition, if the transition to an appropriate mode is performed as appropriate after the image capturing using the single-step REC is terminated, the user can save time and effort in operations to change the mode, further improving the usability of the imaging apparatus 11.

For example, transition patterns TP1 to TP5 described below are conceivable as examples of the mode transition pattern when the single-step REC is used.

The transition patterns TP1 to TP5 will be described below with reference to FIGS. 6 to 10.

(Transition Pattern TP1)

First, the transition pattern TP1 will be described with reference to FIG. 6.

Figure 6:
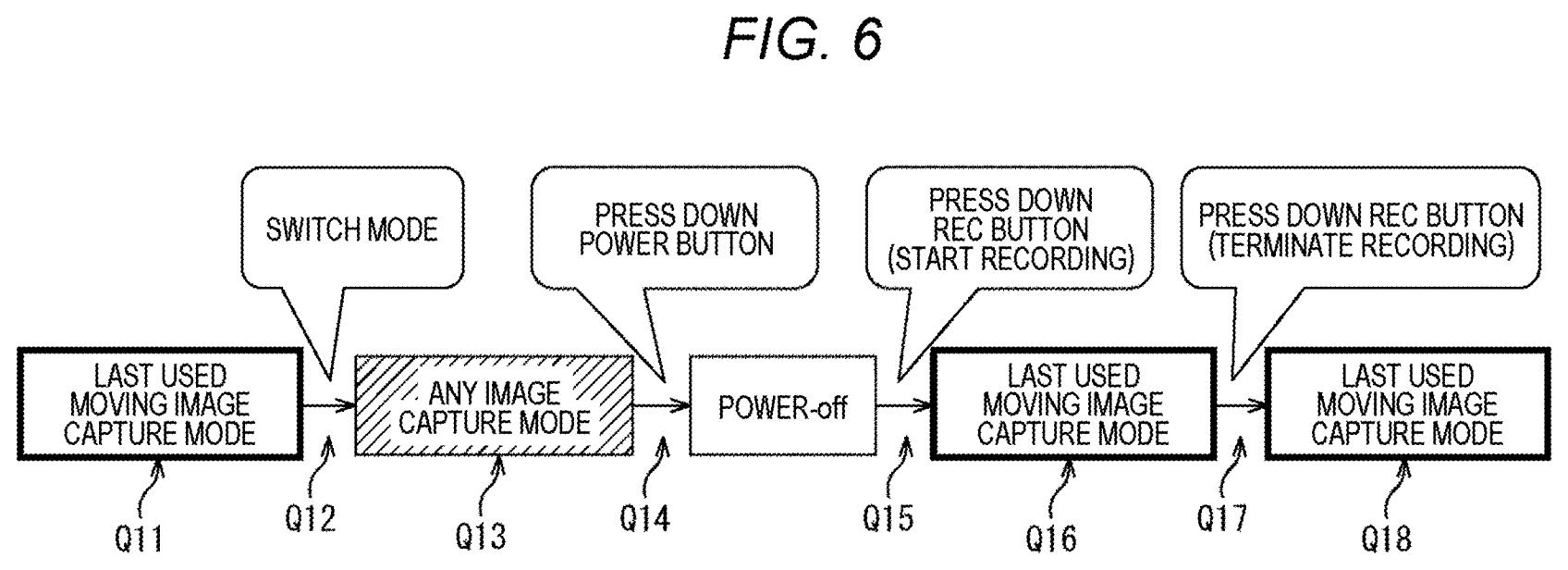

For example, it is assumed that after image capturing is performed in a predetermined moving image capture mode in the moving image mode as indicated by arrow Q11 in FIG. 6, the image capture mode is switched by the user at the timing indicated by arrow Q12, and image capturing is performed in an image capture mode other than the moving image mode as indicated by arrow Q13. That is, it is assumed that image capturing is performed in the still image mode or the S&Q mode at the timing indicated by arrow Q13.

Thereafter, it is assumed that the power of the imaging apparatus 11 is turned off by the user at the timing indicated by arrow Q14.

Therefore, in this case, the moving image capture mode used at the timing indicated by arrow Q11 is the moving image capture mode last used before the power was turned off, that is, the moving image capture mode indicated by the moving image capture mode information.

Furthermore, the image capture mode used at the timing indicated by arrow Q13 is the image capture mode used when the power was turned off, that is, the image capture mode indicated by the power-off mode information.

In such a case, in the transition pattern TP1, as indicated by arrow Q15, when the REC button 25 is pressed down in the power-off state, and the activation of the single-step REC is instructed, as indicated by arrow Q16, the capturing and recording of the moving image are started in the last used moving image capture mode.

At the timing when the single-step REC is activated as indicated by arrow Q16, image capturing is performed in the same moving image capture mode as the moving image capture mode used at the timing indicated by arrow Q11. That is, when the single-step REC is activated, the moving image capture mode is set to be the same as the moving image capture mode last used before the power was turned off.

In addition, when a moving image is captured by the activation of the single-step REC, and the termination of image capturing (termination of recording) is instructed by pressing down the REC button 25 as indicated by arrow Q17, the image capturing using the single-step REC is terminated.

Thereafter, as indicated by arrow Q18, moving image capturing is continuously performed in the moving image mode, and the moving image capture mode after the termination of the image capturing using the single-step REC, that is, the moving image capture mode at the timing indicated by arrow Q18, is set to be the same as the moving image capture mode used at the timing indicated by arrow Q11. That is, even after the image capturing using the single-step REC, the image capturing is performed in the moving image capture mode last used before the power was turned off that is indicated by the moving image capture mode information and was last used before the power was turned off.

Therefore, it can be seen that, in the transition pattern TP1, not only when the single-step REC is activated but also after the image capturing using the single-step REC is terminated, image capturing is continuously performed in the same moving image capture mode as the moving image capture mode last used before the power was turned off.

In this case, the user can continuously capture images in the same moving image capture mode before and after the termination of the image capturing using the single-step REC.

Note that, at the timing indicated by each of arrow Q16 and arrow Q18, the same image capturing setting values, creative look, and picture effect that were used at the timing indicated by arrow Q11 may also be used, in addition to the moving image capture mode.

The transition pattern TP1 as described above can be used in combination with, for example, the activation pattern BP3 described above. Furthermore, for example even in a case where the image capture mode used when the power was turned off is the S&Q mode in the activation pattern BP2, the transition pattern TP1 can be applied.

Moreover, at the timing indicated by arrow Q16 and arrow Q18, image capturing may be performed in the auto mode, that is, the eye auto mode or the blur-priority auto mode, instead of the last used moving image capture mode.

(Transition Pattern TP2)

Figure 7:
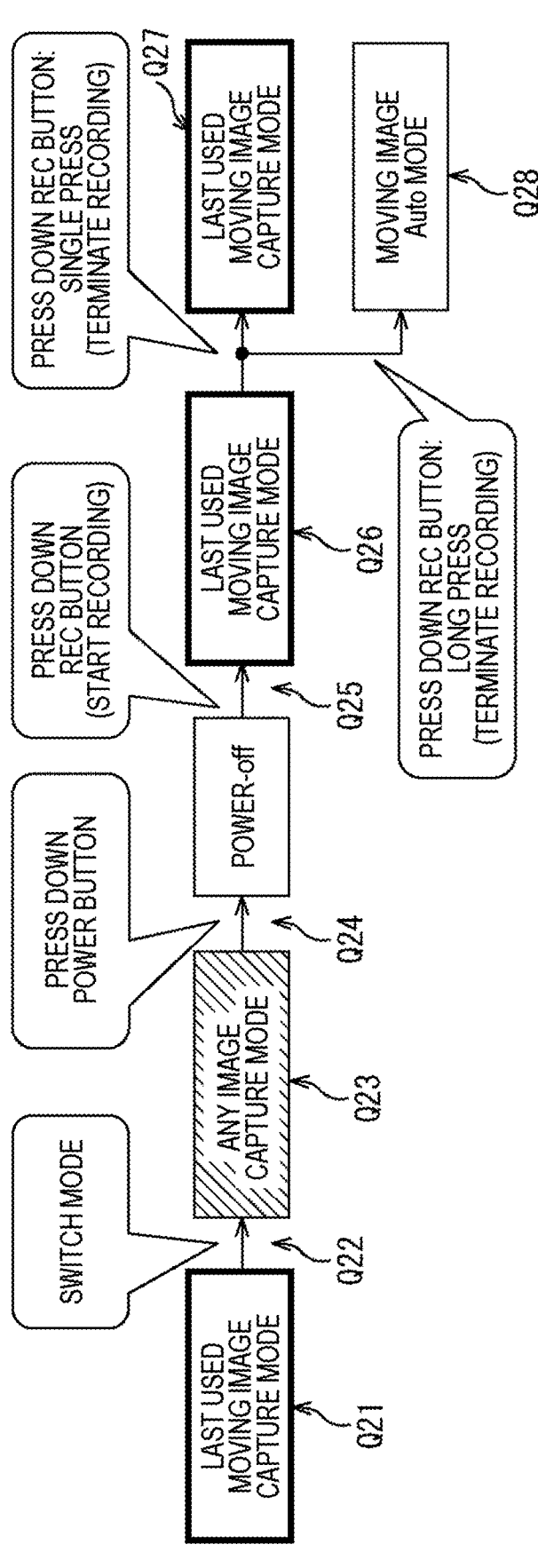
FIG. 7 is a diagram for explaining a transition example of the image capture mode.

Next, the transition pattern TP2 will be described with reference to FIG. 7.

In the transition pattern TP2, the behaviors of the portions indicated by arrow Q21 to arrow Q26 are the same as the behaviors of the portions indicated by arrow Q11 to arrow Q16 of the transition pattern TP1 described with reference to FIG. 6, and hence, the description thereof will be omitted. That is, in the transition pattern TP2 as well, as indicated by arrow Q26, when the single-step REC is activated, image capturing is performed in the moving image capture mode that is indicated by the moving image capture mode information and was last used before the power was turned off.

In addition, it is assumed that, when instructing to terminate image capturing using the single-step REC at the timing indicated by arrow Q26, the user performs an operation of pressing the REC button 25 for a period shorter than a predetermined time (hereinafter also referred to as single press), that is, an operation of simply pressing down the REC button 25.

In such a case, after the image capturing using the single-step REC is terminated, as indicated by arrow Q27, the moving image capture mode is the same as the moving image capture mode used at the timing indicated by arrow Q21.

That is, similarly to the case of the transition pattern TP1, even after the termination of the image capturing using the single-step REC, image capturing is continuously performed in the moving image capture mode that is indicated by the moving image capture mode information and was last used before the power was turned off.

Note that, at the timing indicated by each of arrow Q26 and arrow Q27, the same image capturing setting values, creative look, and picture effect that were used at the timing indicated by arrow Q21 may also be used, in addition to the moving image capture mode.

On the other hand, in a case where the user performs a long press operation in which the REC button 25 is kept pressed down for a predetermined time or more when instructing to terminate the image capturing using the single-step REC at the timing indicated by arrow Q26, the mode transitions to the auto mode as indicated by arrow Q28 after the image capturing using the single-step REC is terminated. That is, the moving image capture mode is set to the auto mode.

The auto mode referred to herein may be the eye auto mode or the blur-priority auto mode. For example, the transition to either the eye auto mode or the blur-priority auto mode may be preset or may be set by the user.

As described above, in the transition pattern TP2, the moving image capture mode is not changed and is kept as it is when the single press is performed as the operation at the termination of the image capturing using the single-step REC, and the moving image capture mode transitions to the auto mode used when the long press is performed as the operation at the termination of the image capturing using the single-step REC.

In the transition pattern TP2, a plurality of different operations can be performed as the operation at the termination of the capturing of the single-step REC, and the user can select a desired moving image capture mode from the plurality of moving image capture modes by performing any one of the operations. That is, the camera control unit 58 determines the moving image capture mode after the termination of the image capturing using the single-step REC, according to the operation at the termination of the image capturing using the single-step REC. Accordingly, usability can be improved.

For example, it is assumed that, when terminating the image capturing (recording) using the single-step REC, the user wants to continue the moving image capturing because the same scene as that at the time of the image capturing using single-step REC continues.

In such a case, when a satisfactory moving image cannot be obtained in the moving image capture mode at the time of the image capturing using the single-step REC, that is, the moving image capture mode last used before the power was turned off, or the like, the user can perform a long press operation for transition to the auto mode. In this way, a moving image that is satisfactory to some extent can be obtained by the auto mode.

Note that, although the single press operation and the long press operation have been described as examples of the operation at the termination of the image capturing using the single-step REC, the present invention is not limited to this example, and any operation may be performed. For example, the mode may transition to the auto mode by a single press operation, and the last used moving image capture mode may be maintained by a long press operation.

The transition pattern TP2 as described above can be used in combination with, for example, the activation pattern BP3 described above. Furthermore, for example, in the activation pattern BP2, the transition pattern TP2 can be applied even in a case where the image capture mode used when the power was turned off is the S&Q mode.

Furthermore, in the activation pattern BP1 and the activation pattern BP2, the transition pattern TP2 may be used in combination with the case where the single-step REC is activated in the image capture mode used when the power was turned off. In such a case, image capturing is continuously performed in the image capture mode as it is, or the transition to the auto mode is performed according to an operation (single press or long press) for terminating the image capturing using the single-step REC.

(Transition Pattern TP3)

The transition pattern TP3 will be described with reference to FIG. 8.

In the transition pattern TP3, the behaviors of the portions indicated by arrow Q31 to arrow Q36 are the same as the behaviors of the portions indicated by arrow Q11 to arrow Q16 of the transition pattern TP1 described with reference to FIG. 6, and hence, the description thereof will be omitted. That is, in the transition pattern TP3 as well, as indicated by arrow Q36, when the single-step REC is activated, image capturing is performed in the moving image capture mode that is indicated by the moving image capture mode information and was last used before the power was turned off.

Note that, at the timing indicated by arrow Q36, the same image capturing setting values, creative look, and picture effect that were used at the timing indicated by arrow Q31 may also be used, in addition to the moving image capture mode.

In addition, when the user presses the REC button 25 or the like to instruct to terminate the image capturing using the single-step REC indicated by arrow Q36, thereafter, as indicated by arrow Q37, the image capture mode transitions to the image capture mode used immediately before the power was turned off, that is, the image capture mode used at the timing indicated by arrow Q33.

In this case, after capturing the moving image using the single-step REC for the time being, the user can capture an image in the image capture mode that was used (last used) immediately before the power was turned off, that is, when the power was turned off. Such mode transition is particularly easy to use, for example, in a case where the scene desired to be captured for the time being is terminated at the time when the image capturing using the single-step REC is terminated, or some other case.

The transition pattern TP3 as described above can be used in combination with, for example, the activation pattern BP3 described above. Furthermore, for example, in the activation pattern BP2, the transition pattern TP3 can be applied even in a case where the image capture mode used when the power was turned off is the S&Q mode. Moreover, at the timing indicated by arrow Q36, image capturing may be performed in the auto mode instead of the last used moving image capture mode.

(Transition Pattern TP4)

The transition pattern TP4 will be described with reference to FIG. 9.

In the transition pattern TP4, the behaviors of the portions indicated by arrow Q41 to arrow Q44 are the same as the behaviors of the portions indicated by arrow Q11 to arrow Q14 of the transition pattern TP1 described with reference to FIG. 6, and hence, the description thereof will be omitted.

In addition, when the REC button 25 is pressed down in the power-off state as indicated by arrow Q45 and the activation of the single-step REC is instructed, the capturing and recording of a moving image in the auto mode are started as indicated by arrow Q46.

The auto mode referred to herein may be the eye auto mode or the blur-priority auto mode. For example, whether to perform activation in the eye auto mode or the blur-priority auto mode may be preset or may be set by the user.

Moreover, when image capturing is performed in the auto mode using the single-step REC, and the termination of image capturing (termination of recording) is instructed by pressing down the REC button 25 or some other means, the image capturing using the single-step REC is terminated.

Thereafter, as indicated by arrow Q47, the moving image capture mode is set to the same mode as the moving image capture mode last used before the power was turned off. That is, at the timing indicated by arrow Q47, image capturing is performed in the same moving image capture mode as the moving image capture mode used at the timing indicated by arrow Q41.

Note that, at the timing indicated by arrow Q47, the same image capturing setting values, creative look, and picture effect that were used at the timing indicated by arrow Q41 may also be used, in addition to the moving image capture mode.

At the time of activating the single-step REC, the user wants to start image capturing immediately to avoid missing the opportunity for image capturing, and often does not have time to change the setting related to image capturing.

Therefore, in the transition pattern TP4, the quality of the moving image is ensured to some extent by using the auto mode when the single-step REC is activated so that a reasonably satisfactory moving image can be obtained at the time of the activation.

In addition, since the user should have enough time to change the setting or the like after the image capturing using the single-step REC is terminated, the mode transitions to the moving image capture mode last used before the power was turned off. Therefore, the user can appropriately make a setting change according to his or her preference and perform more satisfactory image capturing.

As described above, according to the transition pattern TP4, the usability of the imaging apparatus 11 can be improved. The transition pattern TP4 can be used in combination with the activation pattern BP3 described above, for example. Furthermore, for example, in the activation pattern BP2, the transition pattern TP4 can be applied even in a case where the image capture mode used when the power was turned off is the S&Q mode.

(Transition Pattern TP5)

Figure 10:
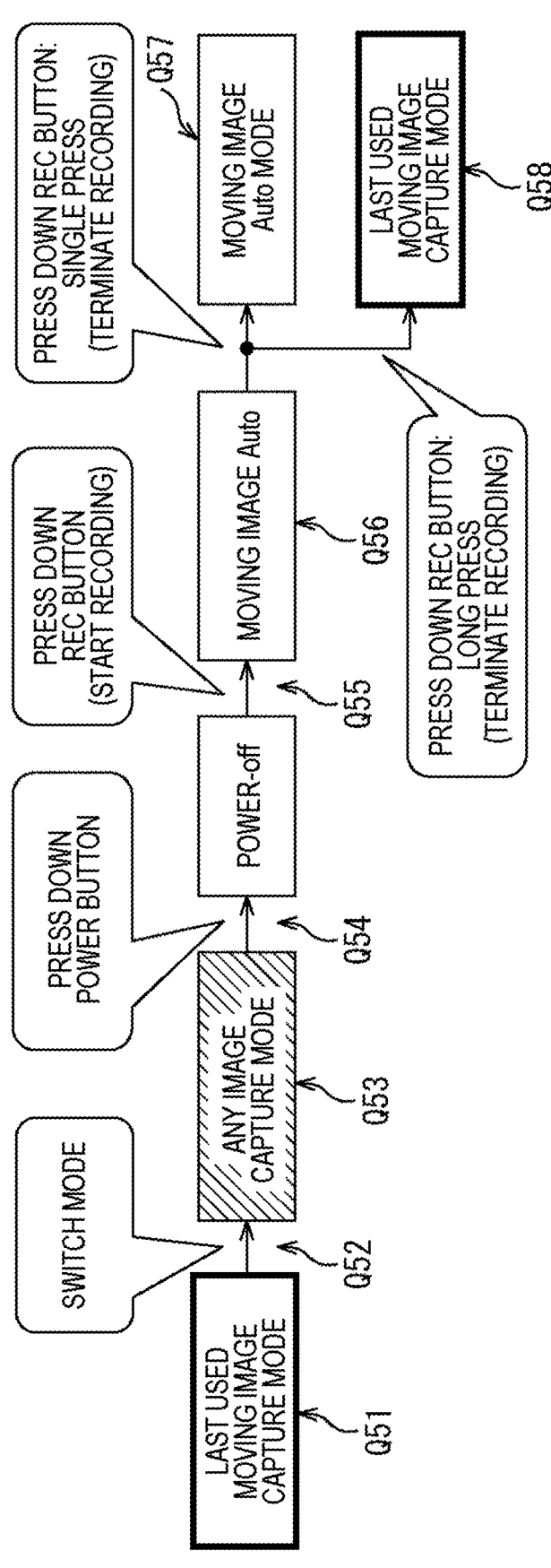
FIG. 10 is a diagram for explaining a transition example of the image capture mode.

The transition pattern TP5 will be described with reference to FIG. 10.

The transition pattern TP5 is a transition pattern in which the transition pattern TP4 and the transition pattern TP2 described above are combined, and the next moving image capture mode can be selected by an operation at the termination of the image capturing using the single-step REC.

In the transition pattern TP5, the behaviors of the portions indicated by arrow Q51 to arrow Q56 are the same as the behaviors of the portions indicated by arrow Q41 to arrow Q46 of the transition pattern TP4 described with reference to FIG. 9, and hence, the description thereof will be omitted. That is, in the transition pattern TP5 as well, as indicated by arrow Q56, image capturing is performed in the auto mode when the single-step REC is activated.

In addition, it is assumed that the user performs a single-press operation of the REC button 25 when instructing to terminate the image capturing using the single-step REC at the timing indicated by arrow Q56.

In such a case, after the image capturing using the single-step REC is terminated, the image capturing is continuously performed in the auto mode as indicated by arrow Q57.

In the transition pattern TP5, the auto mode may be either the eye auto mode or the blur-priority auto mode, but the same auto mode (moving image capture mode) is set at the timing indicated by arrow Q56 and the timing indicated by arrow Q57.

In contrast, it is assumed that the user performs a long-press operation of the REC button 25 when instructing to terminate the image capturing using the single-step REC at the timing indicated by arrow Q56.

In such a case, after the termination of the image capturing using the single-step REC, as indicated by arrow Q58, the moving image capture mode transitions from the auto mode to the moving image capture mode that is indicated by the moving image capture mode information and was last used before the power was turned off. That is, at the timing indicated by arrow Q58, the mode transitions to the same moving image capture mode as that used at the timing indicated by arrow Q51.

Note that, at the timing indicated by arrow Q58, the same image capturing setting values, creative look, and picture effect that were used at the timing indicated by arrow Q51 may also be used, in addition to the moving image capture mode.

Furthermore, similarly to the case of the transition pattern TP2, any combination of the type of operation for the REC button 25 and the moving image capture mode selected according to the operation may be used, such as the auto mode is maintained by the long press operation, and the mode transitions to the moving image capture mode last used before the power was turned off by the single press operation.

Similarly to the case of the transition pattern TP2, the transition pattern TP5 as described above also allows the user to select a desired moving image capture mode and enables improvement in usability. The transition pattern TP5 can be used in combination with the activation pattern BP3 described above, for example. Furthermore, for example, in the activation pattern BP2, the transition pattern TP5 can be applied even in a case where the image capture mode used when the power was turned off is the S&Q mode.

As described above, according to the transition patterns TP1 to TP5, the moving image capture mode last used before the power was turned off is recorded as the moving image capture mode information.

Then, the image capture mode is set to the moving image mode at the time of activation of the single-step REC or at the time of moving image capturing immediately after the image capturing using the single-step REC is terminated. In particular, in this case, when the single-step REC is activated or when a moving image is captured immediately after the image capturing using the single-step REC is terminated, the moving image capture mode is set to the moving image capture mode that is indicated by the moving image capture mode information and was last used before the power was turned off, and the moving image is captured in that moving image capture mode. In this way, the usability of the imaging apparatus 11 can be improved.

<Activation of Single-Step REC>

Note that the user can assign a preset button or the like related to the single-step REC function, that is, for example, another function different from those for moving image capturing to the REC button 25.

Specifically, for example, the user can individually set a function that is executed (called) when the REC button 25 is operated in a state where the image capture mode is the moving image mode, and a function that is executed when the REC button 25 is operated in a state where the image capture mode is the still image mode.

Furthermore, the user can also set whether to enable (turn on) or disable (turn off) the single-step REC function on the menu screen (setting screen) displayed on the display unit 55.

For example, in the imaging apparatus 11, the single-step REC is activated only in a case where the single-step REC function is set to on (enabled) and the function assigned to the REC button 25 in the moving image mode is a mode for moving image capturing, that is, the function to start capturing a moving image.

Therefore, for example, when the single-step REC function is set to on and the function assigned to the REC button 25 in the moving image mode is a mode for moving image capturing, the single-step REC can be used regardless of what the function assigned to the REC button 25 in the still image mode is. That is, when the REC button 25 is operated in the power-off state, the single-step REC is activated.

When the function assigned to the REC button 25 in the moving image mode is a mode for moving image capturing, the single-step REC is activated regardless of the assignment in the still image mode because the single-step REC is provided as a function capable of instantly starting capturing an accidental scene or the like.

In contrast, for example, even if the single-step REC function is set to on, the single-step REC cannot be used unless the function assigned to the REC button 25 in the moving image mode is a mode for moving image capturing.

In this case, even if the function assigned to the REC button 25 in the still image mode is a mode for moving image capturing, that is, the direct REC function, the single-step REC cannot be used. This is because the single-step REC is a function to activate the moving image mode.

Furthermore, in the imaging apparatus 11, the single-step REC function may be on (enabled), and the function assigned to the REC button 25 in the moving image mode may not be a function other than those for moving image capturing.

Figure 11:
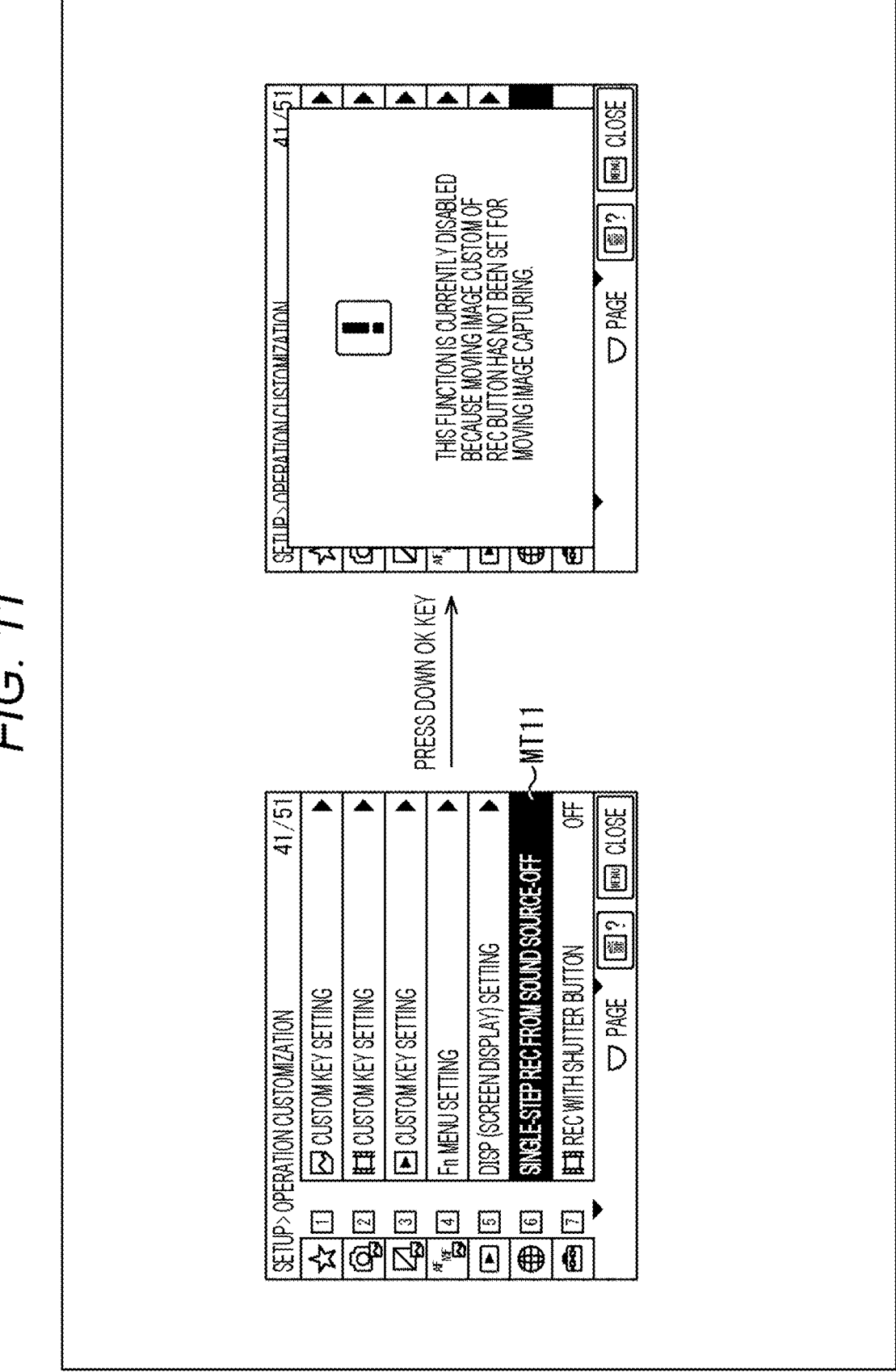
FIG. 11 is a diagram for explaining a setting related to the single-step REC.

For example, it is assumed that the function assigned to the REC button 25 in the moving image mode is a function different from those for moving image capturing, and the setting screen (menu screen) illustrated on the left side of FIG. 11 is displayed on the display unit 55.

In this state, it is assumed that the user operates the operation unit 57 to move a cursor, selects a menu item MT 11 displaying the characters "SINGLE-STEP REC FROM POWER-OFF", and determines the selection of the menu item MT 11. Here, the menu item MT 11 is for turning on and off the single-step REC function.

In this case, when the user operates the operation unit 57 to instruct the selection and determination of the menu item MT 11 and set the single-step REC function to on, the camera control unit 58 does not accept the user's operation of setting the single-step REC function to on, and causes the display unit 55, illustrated on the right side in the figure, to display a message.

In this example, since the function assigned to the REC button 25 in the moving image mode is not a function for moving image capturing, a message indicating that the operation of setting the single-step REC function to on is disabled is displayed on the display unit 55.

As described above, in a case where the REC button 25 is set such that the moving image capture function is not assigned in the moving image mode (the assigned function is a function other than those for moving image capturing), the camera control unit 58 does not enable the single-step REC function to be set to on. As a result, even if the user operates the REC button 25, the single-step REC is not activated, thereby making it possible to prevent the loss of the image capturing opportunity.

Furthermore, since the user who has viewed the message shown on the right side in the figure knows the function assigned to the REC button 25 in the moving image mode is only required to be a function for moving image capturing, the user can appropriately make a setting and use the single-step REC function.

Moreover, a warning message may be displayed in a case where the user tries to change the function assigned to the REC button 25 in the moving image mode from the function for moving image capturing to a function other than those for moving image capturing in a state where the single-step REC function is set to on (enabled) in the menu.

Figure 12:
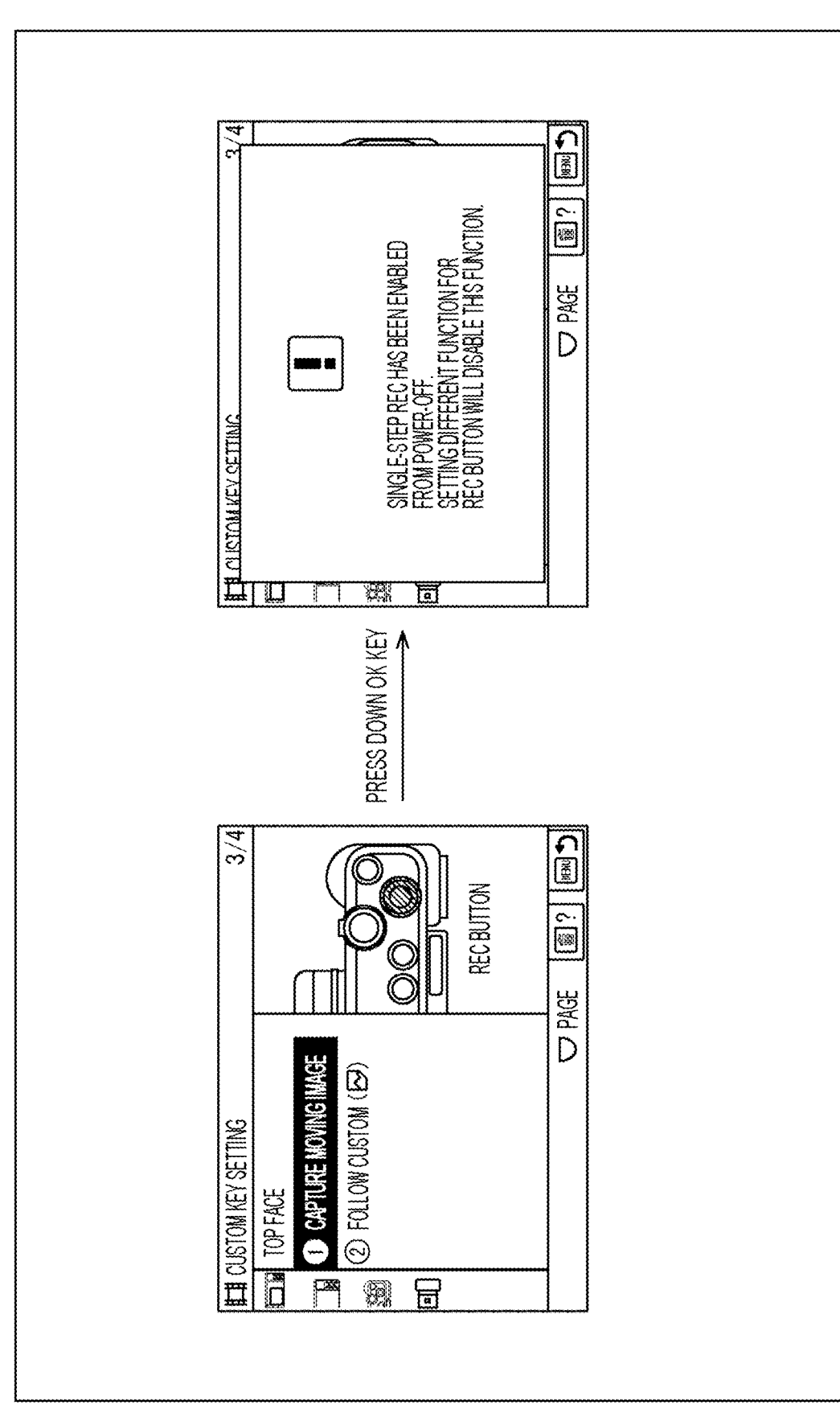
FIG. 12 is a diagram for explaining a setting related to the single-step REC.

Specifically, for example, it is assumed that the setting screen illustrated on the left side of FIG. 12 is displayed on the display unit 55 in a state where the single-step REC function is set to on.

On the left side of FIG. 12, a setting screen for selecting the function assigned to the REC button 25 in the moving image mode is illustrated, and at the present time, the function assigned to the REC button 25 in the moving image mode is a mode for moving image capturing. It is assumed that the user operates the operation unit 57 from such a state to perform an operation for changing the assigned function for the REC button 25 from the function for moving image capturing to another function different from those for moving image capturing.

In such a case, the camera control unit 58 causes the display unit 55, illustrated on the right side in the figure, to display displays a warning message for calling the user's attention.

In this example, the single-step REC function is set to on, and a warning message indicating that the single-step REC cannot be used is presented to the user when a function other than those for moving image capturing is assigned (set) to the REC button 25, that is, the assigned function is changed.

As a result, it is possible to prevent the user from changing the function assigned to the REC button 25 in the moving image mode to a function other than those for moving image capturing in a state where the single-step REC function is set to on (enabled) to make the single-step REC function unusable.

Note that a warning message may be displayed in a case where, in a state where the single-step REC function is set to on (enabled), the user instructs to assign another function different from those for moving image capturing to the REC button 25 as an assignment function in the moving image mode.

Specifically, for example, it is assumed that the user operates the operation unit 57 in a state where the setting screen illustrated on the left side of FIG. 12 is displayed to perform an operation for changing the assigned function to the REC button 25 from the function for moving image capturing to another function. Then, it is assumed that the user further operates the operation unit 57 and instructs to assign another function, which is different from those for moving image capturing, to the REC button 25

More specifically, it is assumed that the user performs an operation to determine the selection of a function other than those for moving image capturing. In such a case, the camera control unit 58 causes the display unit 55 to display a warning message similar to that illustrated on the right side in the figure to call the user's attention.

The operation for changing the assigned function from the function for moving image capturing to another function and the operation for instructing to assign another function different from those for moving image capturing are both operations for assigning another function different from the moving image capture function to the REC button 25. If a warning message is displayed in a case where such an operation is performed, it is possible to prevent a setting in which the single-step REC is not activated without the user's notice.

<Depth Switching>

Meanwhile, the imaging apparatus 11 is provided with a depth switching function to change a depth of field and switch a blurred state of a background image.

In the depth switching function, the user can specify the state of the background image, that is, whether the blurring of the background is set to a "blurred state" or a "clear state".

For example, when the depth switching function is turned on and the "blurred state" is selected (specified) by the user, the F value (aperture value) at the time of image capturing is set to an open F value, that is, the smallest value. In this case, an image with a blurred background and a shallow depth of field is obtained.

In contrast, when the depth switching function is turned on and the "clear state" is selected (specified) by the user, the F value (aperture value) at the time of image capturing is set to a predetermined fixed F value such as "F5.6". In this case, an image with a clear background and a deep depth of field can be obtained.

Here, the fixed F value is set to a value larger than the F value in the "blurred state". The fixed F value is a preset fixed value, but the user may set the fixed F value. Note that the F value in the "blurred state" may not be the open F value as long as the F value is smaller than the fixed F value in the "clear state".

In the following, a specific example of the depth switching function will be described with reference to FIGS. 13 to 15. Note that, in the examples illustrated in FIGS. 13 to 15, to simplify the description, the description will be given assuming that the function to switch between the "blurred state" and the "clear state" has been assigned to the custom button 27. However, the function for such switching may naturally be assigned to another button or the like as the operation unit 57.

Figure 13:
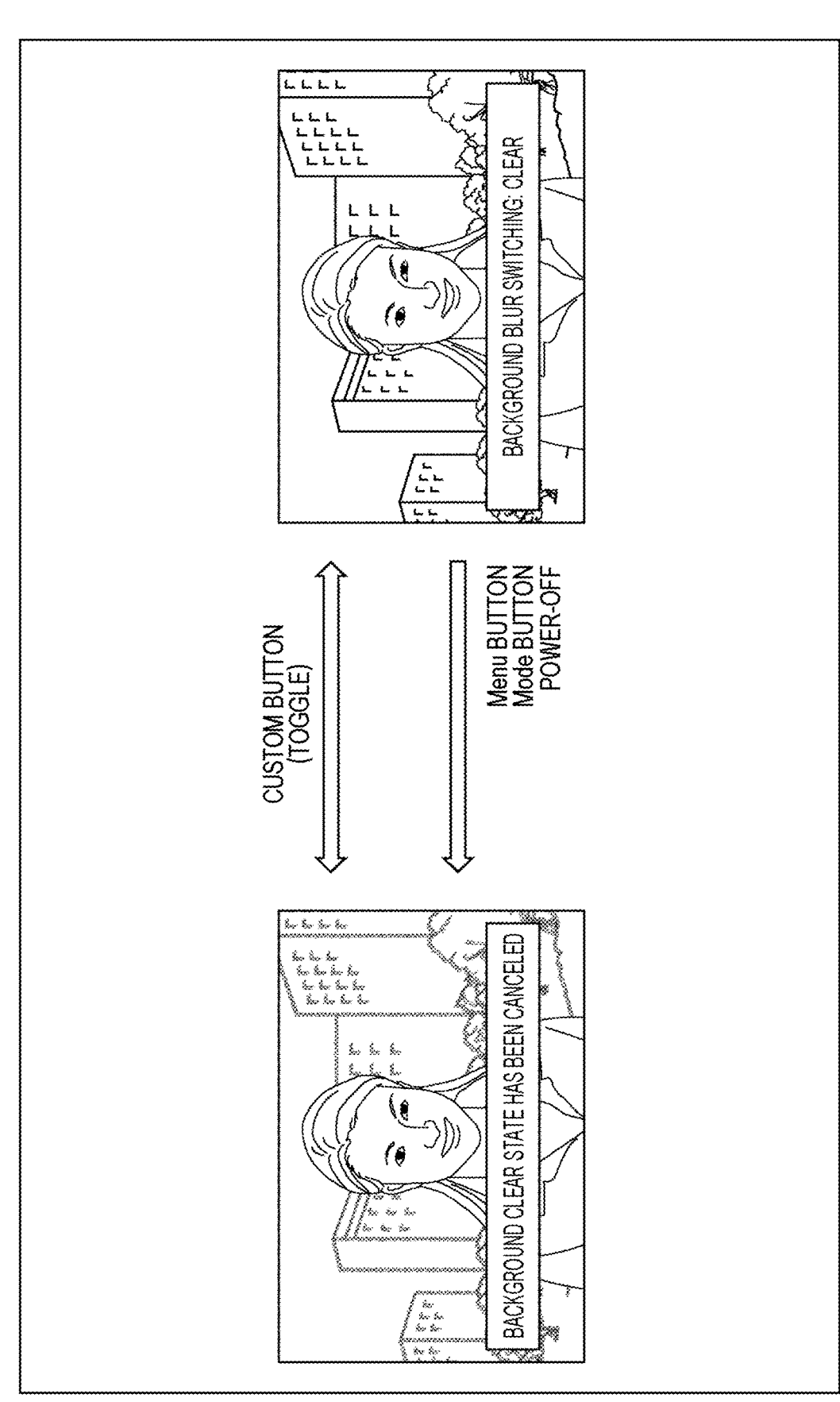
FIG. 13 is a diagram for explaining depth switching.

When the user operates the operation unit 57 while the moving image capture mode is the blur-priority auto mode, the depth switching function can be turned on or off as illustrated in FIG. 13, for example.

In FIG. 13, a display example of the display unit 55 when the depth switching function is turned off (canceled) is illustrated on the left side in the figure, and a display example of the display unit 55 when the depth switching function is turned on is illustrated on the right side in the figure.

In the blur-priority auto mode, the image capturing setting value is determined such that the F value is as small as possible, and hence, the image capturing setting value is almost the same between the blur-priority auto mode and the depth switching in the "blurred state".

Therefore, in a case where the moving image capture mode is the blur-priority auto mode, when the depth switching function is turned on, the "clear state" is always selected. In other words, the on/off status of the depth switching function is the on/off status of the "clear state".

For example, when the user presses (presses down) the custom button 27 in the state of the blur-priority auto mode illustrated on the left side in the figure, that is, in a state where the "clear state" has been canceled, the state transitions to the state illustrated on the right side in the figure, that is, the "clear state". In this case, the F value as the image capturing setting value is the fixed F value, and a moving image with a clear background and a deep depth of field can be obtained.

Furthermore, for example, when the user presses the custom button 27 in the state illustrated on the right side in the figure, that is, in the "clear state", the "clear state" is canceled, and the state illustrated on the left side in the figure, that is, the state of the blur-priority auto mode, is entered. Therefore, in this case, the F value as the image capturing setting value is set to a value as small as possible within a range in which the picture of the image does not fail, and a moving image with a shallow depth of field in which the background is blurred is obtained.

In this manner, when the user operates the custom button 27, the camera control unit 58 alternately switches between the "clear state" and the state where the "clear state" has been canceled, that is, the state of the blur-priority auto mode, according to the user's operation. In other words, the "clear state" is switched on and off by a toggle method.

In addition, for example, when the user presses the menu button, the mode button 24, or the power button 26 as the operation unit 57 in the "clear state" illustrated on the right side in the figure, the "clear state" is canceled and the state illustrated on the left side in the figure is entered.

Figure 14:
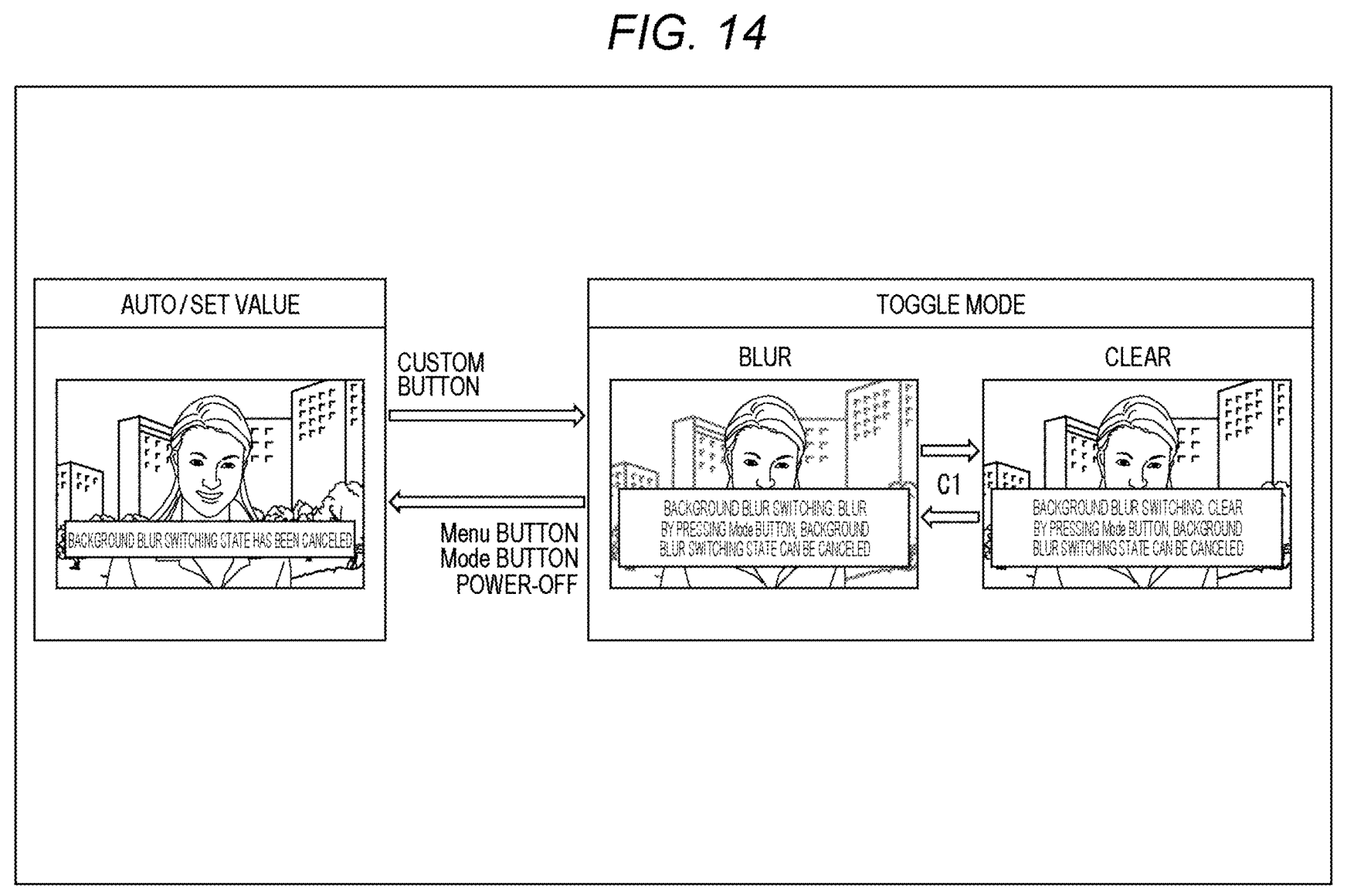

Furthermore, in the case of an image capture mode or a moving image capture mode in which the depth switching function other than the blur-priority auto mode can be used, such as the eye auto mode or the S&Q mode, for example, the depth switching function is turned on or off as illustrated in FIG. 14.

In FIG. 14, a display example of the display unit 55 when the depth switching function is turned off (canceled) is illustrated on the left side in the figure, and a display example of the display unit 55 when the depth switching function is turned on is illustrated on the right side in the figure.

For example, when the user presses the custom button 27 in a state illustrated on the left side in the figure, that is, in a state where the depth switching function is turned off (canceled), the state transitions to a state illustrated on the right side in the figure, that is, a state where the depth switching function is turned on.

When the depth switching function is turned on, the mode is set to the toggle mode, and the "blurred state" is set regardless of the state of the transition source. In the toggle mode, when the user operates the custom button 27, the "blurred state" and the "clear state" are alternately switched according to the user's operation. That is, the camera control unit 58 alternately switches between the "blurred state" and the "clear state" by the toggle method according to the user's operation.

In addition, when the user presses the menu button, the mode button 24, or the power button 26 as the operation unit 57 in a state where the depth switching function illustrated on the right side in the figure is turned on, that is, in the state of the toggle mode, the camera control unit 58 turns off the depth switching function to be in the state illustrated on the left side in the figure. In other words, the camera control unit 58 cancels the toggle mode.

In this example, it is assumed that the depth switching function is used as a function to temporarily change the depth of field, that is, to temporarily change image creation. Therefore, when the menu button, the mode button 24, or the power button 26 is pressed, the scene is assumed to be changed, and the depth switching function is canceled. That is, image creation is reset.

As described above, in a case where the custom button 27 is operated, the "clear state" is turned on and off in a state where the moving image capture mode is the blur-priority auto mode, whereas the "blurred state" and the "clear state"

are switched in an image capture mode or a moving image capture mode in which the depth switching function other than the blur-priority auto mode is available.

That is, even in a case where the same operation of pressing the custom button 27 is performed, depending on the image capture mode, more specifically, depending on whether or not the mode is the blur-priority auto mode, the performance varies between turning on or off the "clear state and switching of the "blurred state" and the "clear state" in the depth switching function.

In other words, according to the image capture mode, the camera control unit 58 determines (switches) whether to make an alternate switch between the execution and non-execution of image capturing in the "blurred state" in response to a predetermined operation on the operation unit 57, or to make an alternate switch between the "blurred state" and the "clear state" in the depth switching function in response to a predetermined operation on the operation unit 57.

Figure 15:
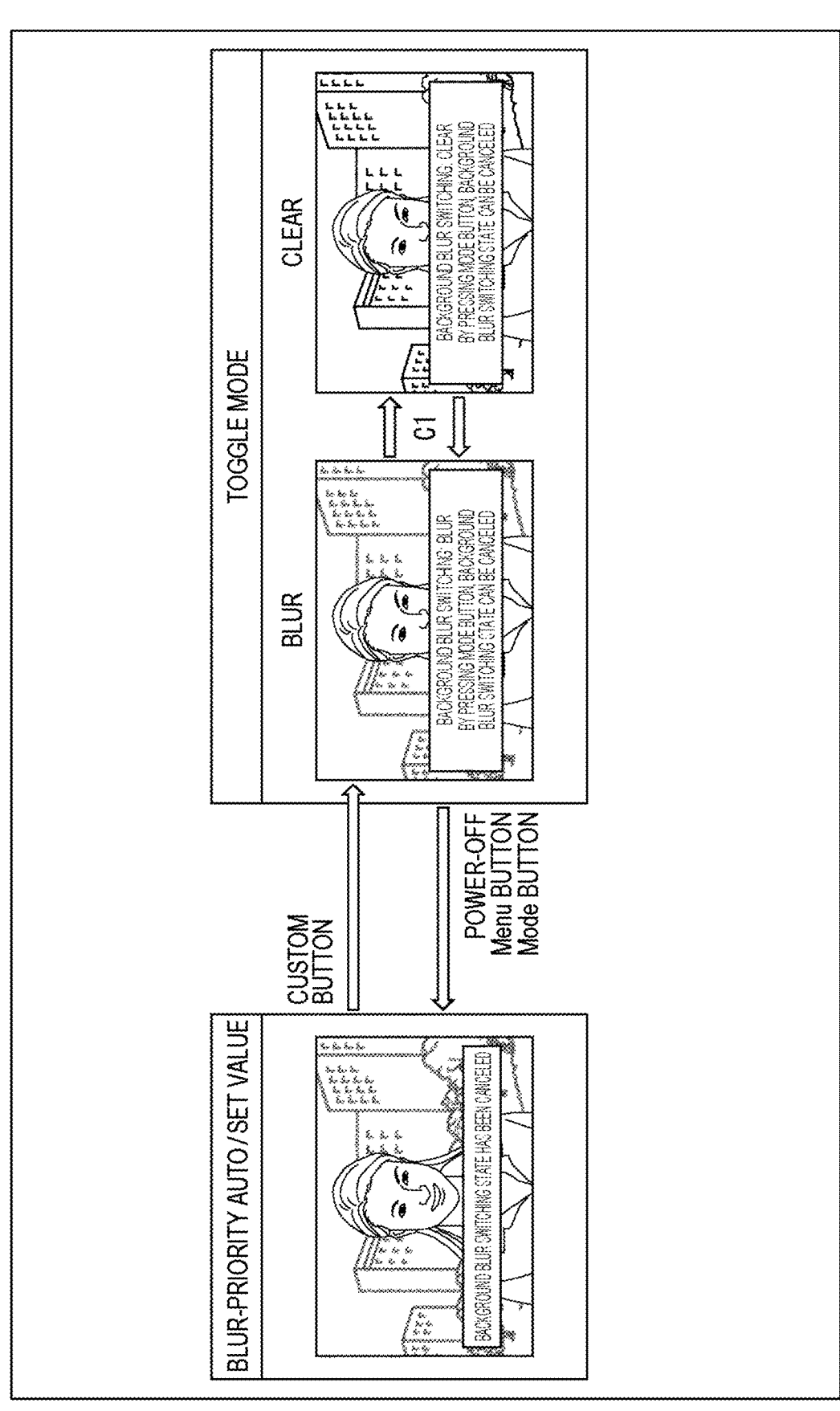
FIG. 15 is a diagram for explaining the depth switching.

Note that, in a case where the moving image capture mode is the blur-priority auto mode, the depth switching function may be turned on and off similarly to the example of FIG. 14, for example, as illustrated in FIG. 15, instead of turning on and off the "clear state" as illustrated in FIG. 13.

In FIG. 15, a display example of the display unit 55 when the depth switching function is turned off (canceled), that is, in the blur-priority auto mode, is illustrated on the left side, and a display example of the display unit 55 when the depth switching function is turned on is illustrated on the right side.

For example, in the state illustrated on the left side in the figure, that is, in a case where the depth switching function is turned off and the blur-priority auto mode is set, the F value as the image capturing setting value is set to a value as small as possible within a range in which the picture of the image does not fail, and a moving image with a blurred background and a shallow depth of field is obtained.

When the user performs an operation on the custom button 27 in a state where the depth switching function illustrated on the left side in the figure is off, the state transitions to a state illustrated on the right side in the figure, that is, the state where the depth switching function is on.

When the depth switching function is turned on, the camera control unit 58 performs image capturing in the toggle mode capable of alternately switching between the "blurred state" and the "clear state". That is, when the depth switching function is turned on, the toggle mode is set. When the mode is set to the toggle mode, the "blurred state" is obtained regardless of the state of the transition source.

In the toggle mode, when the user operates the custom button 27, the "blurred state" and the "clear state" are alternately switched according to the user's operation. In other words, the camera control unit 58 switches between the "blurred state" and the "clear state" by the toggle method according to the user's operation.

In the "blurred state", the F value at the time of image capturing is the open F value, and an image with a blurred background and a shallow depth of field is obtained.

In addition, when the user presses the menu button, the mode button 24, or the power button 26 as the operation unit 57 in a state where the depth switching function illustrated on the right side in the figure is turned on, that is, in the state of the toggle mode, the camera control unit 58 turns off the depth switching function to be in the state illustrated on the left side in the figure. In other words, the camera control unit 58 cancels the toggle mode.

Note that, in addition to the case where the eye auto mode and the blur-priority auto mode are provided as the auto modes, there is also a case where the eye auto mode is not provided and the auto mode is only the blur-priority auto mode. Even in such a case, when the depth switching function is used in the state of the blur-priority auto mode, it is only required to turn on or off the "clear state" or the depth switching function, as illustrated in FIGS. 13 and 15.

As described above, the camera control unit 58 turns on and off the depth switching function or switches between the "blurred state" and the "clear state" on the basis of a signal supplied from the operation unit 57 according to the user's operation. As a result, the user can change the depth of field with a simple operation. That is, usability can be improved.

<Provision of Shot Mark>

Furthermore, in the imaging apparatus 11, a shot mark for extracting a desired section can be provided to a moving image to be captured.

As described later, when a shot mark is provided to a moving image, a predetermined section including the shot mark can be trimmed to form a new moving image.

Such a shot mark can be provided during the capturing of a moving image or during playback of a moving image after image capturing. In addition, a plurality of shot marks can be provided to one moving image.

In the following, the provision of a shot mark will be described with reference to FIGS. 16 and 17.

For example, before the capturing of a moving image is started, that is, before recording is started, a screen indicated by arrow Q71 in FIG. 16 is displayed on the display unit 55.

In this state, when the user instructs to start capturing a moving image by pressing the REC button 25 or the like, the camera control unit 58 controls each unit of the imaging apparatus 11 to capture and record a moving image, and causes the display unit 55 to display a screen indicated by arrow Q72.

On the screen indicated by arrow Q72, the image of the subject is actually displayed, and the characters "REC" indicating that image capturing is being performed are displayed at the lower left of the screen in the figure.

During moving image capturing, for example, when the user thinks that a good moving image is being captured or when a moving image to be trimmed is being captured, the user operates the operation unit 57 to instruct to provide a shot mark.

Then, the camera control unit 58 generates shot mark information and causes the display unit 55 to display a screen indicated by arrow Q73. The shot mark information is information indicating the playback time (playback position) at which a shot mark is provided in the moving image, that is, the playback time specified by the user's operation on the operation unit 57.

A message MS11 indicating that a shot mark has been provided is displayed on the screen indicated by arrow Q73. Accordingly, the provision of a shot mark is fed back to the user by a text message.

Note that, when the provision (addition) of a shot mark is instructed, for example, the button or the like of the operation unit 57, to which a shot mark provision function has been assigned, is operated. Specifically, for example, when an operation is performed on the custom button 27, a region of a touch panel corresponding to a button displayed on the display unit 55, or the like, a shot mark is provided.

During image capturing, the user can provide shot marks any number of times at any timing. In addition, when the user presses the REC button 25 or the like to instruct to terminate the capturing of the moving image, a display screen indicated by arrow Q74 is displayed on the display unit 55, and the image capturing is terminated.

Furthermore, the user can provide a shot mark also when a captured moving image is being played back in the imaging apparatus 11.

When the user operates the operation unit 57 and selects a moving image to be played back, for example, a screen indicated by arrow Q81 in FIG. 17 is displayed on the display unit 55.

Then, when the playback of the moving image is started, the moving image is played back on the display screen of the display unit 55 as indicated by arrow Q82. At this time, a scroll bar SL11 is displayed on the display screen to indicate the time (playback position) currently being played back in the entire moving image.

Furthermore, similarly to the case of providing a shot mark at the time of image capturing, the user instructs to provide a shot mark by operating the operation unit 57 when the user thinks that a good moving image is being captured. Then, the camera control unit 58 generates shot mark information and causes the display unit 55 to displays a screen indicated by arrow Q83.

On the screen indicated by arrow Q83, a message MS21 indicating that a shot mark has been provided is displayed, and accordingly, the provision of a shot mark is fed back to the user by a text message. Moreover, an icon W11 indicating that a shot mark has been provided is also displayed on the upper left of the screen indicated by arrow Q83.

Note that, when the provision (addition) of a shot mark is instructed, for example, similarly to the case of the provision of a shot mark during image capturing, the button or the touch panel as the operation unit 57, to which the shot mark provision function has been assigned, is operated.

During the playback of the moving image, the user can provide shot marks an arbitrary number of times at an arbitrary timing. Furthermore, when the playback of the moving image is terminated, a display screen indicated by arrow Q84 is displayed on the display unit 55.

In this example, the icon W12 and the scroll bar SL11 are displayed on the display screen indicated by arrow Q84. For example, the icon W12 indicates that a shot mark has been provided to the moving image (moving image file) itself, that is, there is a portion where a shot mark has been provided in the moving image. Therefore, the user can recognize that a shot mark has been provided to the moving image by checking the icon W12.

Furthermore, in this example, a mark (vertical line) indicating that a shot mark has been provided is displayed at a portion of the scroll bar SL11 at the time when the shot mark has been provided, and the user can instantaneously grasp where the shot mark has been provided in the moving image.

In addition, for example, the user can delete the provided shot mark by operating the button as the operation unit 57 to which the shot mark provision function has been assigned. In such a case, for example, the user may select one or more shot marks on the scroll bar SL11 or the like so that the selected shot marks can be collectively deleted.

When a shot mark is provided to the moving image, shot mark information about the provided shot mark is associated with the moving image and recorded on a recording medium (not illustrated). For example, the shot mark information may be stored in the metadata of the moving image, and the moving image and the metadata may be recorded as one moving image file.

<Retrieval of Moving Image>

Furthermore, an information processing apparatus such as a smartphone connected to the imaging apparatus 11 in a wired or wireless manner can retrieve a moving image recorded in the imaging apparatus 11.

In a case where the information processing apparatus retrieves a moving image, the information processing apparatus installs a dedicated application program (hereinafter also referred to as a dedicated application) related to the imaging apparatus 11 in advance, and executes the dedicated application.

Figure 18:
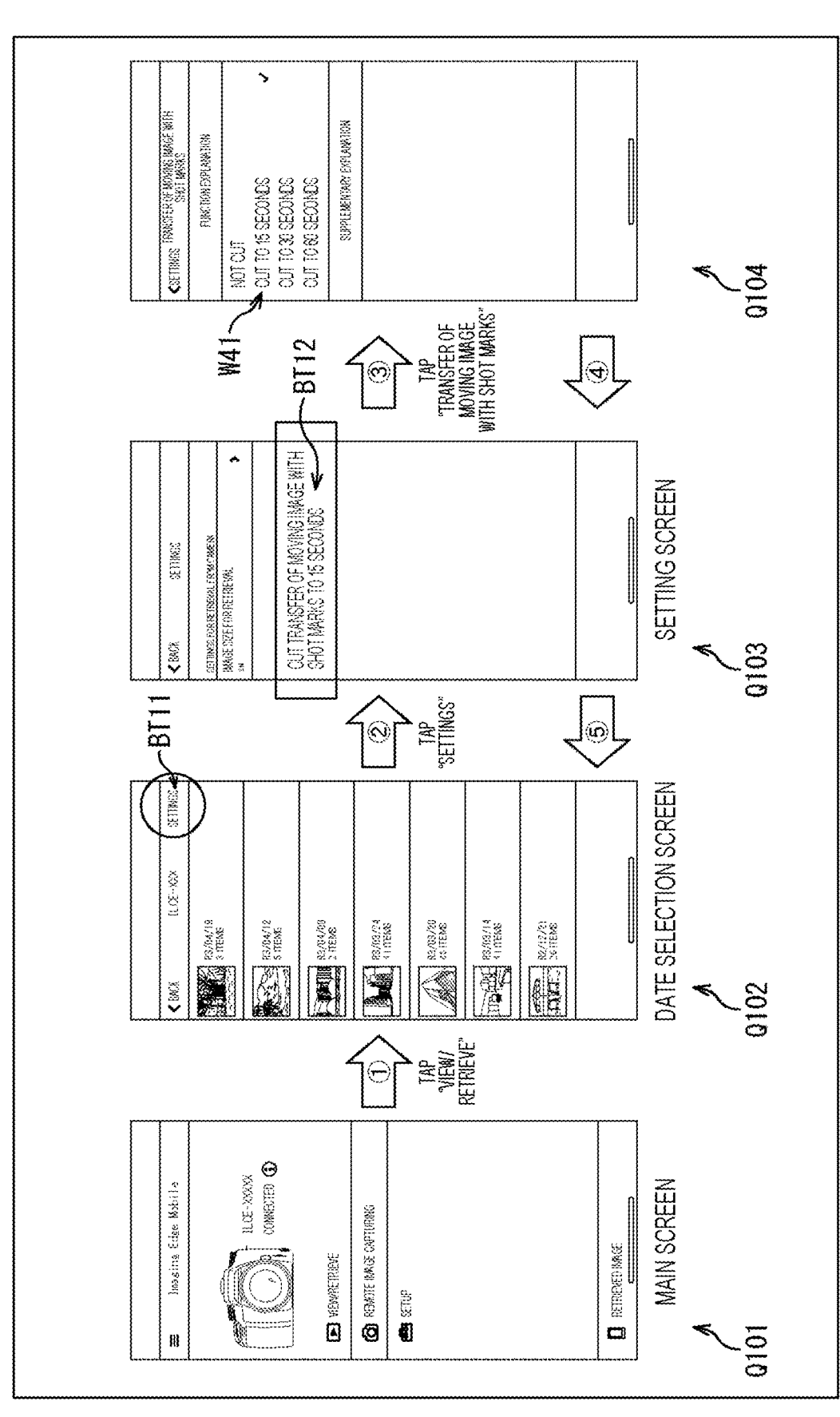
FIG. 18 is a diagram for explaining the retrieval of a moving image.

Then, for example, a main screen indicated by arrow Q101 in FIG. 18 is displayed on the information processing apparatus. A plurality of buttons is displayed on the main screen indicated by arrow Q101, and in the case of retrieving (transferring) a moving image, the user operates a button displaying the characters "VIEW/RETRIEVE".

When such a button operation is performed, the screen display of the information processing apparatus transitions from the main screen indicated by arrow Q101 to a date selection screen indicated by arrow Q102.

For example, on the date selection screen, a list of dates that are image capturing dates for moving images is displayed, and in each data field, a thumbnail image of one representative moving image among one or more moving images captured on the date is displayed. Here, the representative moving image is a moving image or the like at the head of the moving images arranged in the image capturing order.

Furthermore, a setting button BT11 for a setting related to the retrieval of a moving image is provided on the date selection screen. When the user operates the setting button BT11 by tapping or the like, a setting screen indicated by arrow Q103 is displayed on the display screen of the information processing apparatus.

In this example, the setting screen is provided with a button BT12 for setting the length of a section trimmed from the moving image at the time of retrieving the moving image provided with shot marks.

For example, when a moving image provided with shot marks is retrieved, a section (hereinafter also referred to as a trimmed section) having a predetermined length that includes a playback time (playback position) provided with the shot mark in the moving image is trimmed, and only the trimmed moving image of the section can be retrieved.

Note that the section (trimmed section) trimmed from the moving image is, for example, a section having a predetermined length centered on the playback time at which the shot mark has been provided.

In the following, a section trimmed from the moving image, that is, the length of the trimmed section is also referred to as a trimmed section length, and a new moving image obtained by trimming the trimmed section from the moving image is also referred to as a retrieved moving image.

In a case where the user wants to change the trimmed section length, the user taps (operates) the button BT12. Then, on the display screen of the information processing apparatus, for example, a selection screen indicated by arrow Q104 is displayed.

A plurality of selection items including a selection item W41 is displayed on the selection screen, and the user can specify the trimmed section length by selecting one of the selection items.

For example, in this example, a checkmark is displayed in the selection item W41, and it can be seen that the selection item W41 has been selected.

The characters "CUT TO 15 SECONDS" are displayed in the selection item W41, and in a case where the selection item W41 is selected, a 15-second section of the moving image, which includes the position of the shot mark, is trimmed from the original moving image as the retrieved moving image.

Furthermore, for example, in a case where a selection item in which the characters "NOT CUT" are displayed is selected, even in a case where a shot mark has been provided to the moving image, a section including the position of the shot mark is not trimmed, and the original moving image itself is retrieved as the retrieved moving image.

Note that, although an example in which the user specifies the trimmed section length will be described here, the user may be able to specify the start time (start position) and the end time for the trimmed section in each retrieved moving image.

Furthermore, here, an example has been described in which a setting related to the retrieved moving image, such as the specification of the trimmed section length, is performed on the information processing apparatus side. However, the setting related to the retrieved moving image can also be performed on the imaging apparatus 11 side. In such a case, the setting screen indicated by arrow Q103 or a selection screen indicated by arrow Q104 is displayed on the display unit 55 of the imaging apparatus 11 according to the user's operation, and the user operates the operation unit 57 to specify the trimmed section length or the like.

When the user performs an operation to return the display to the setting screen after selecting the selection item corresponding to the desired trimmed section length, the display screen of the information processing apparatus returns from the selection screen indicated by arrow Q104 to the setting screen indicated by arrow Q103.

In this example, the characters "TRANSFER OF MOVING IMAGE WITH SHOT MARKS: CUT TO 15 SECONDS" indicating the trimmed section length corresponding to the selection item selected on the selection screen are displayed on the button BT12 on the setting screen, allowing the user to know how many seconds of the section will be trimmed as the retrieved moving image.

Thereafter, when the user returns the display from the setting screen to the date selection screen indicated by arrow Q102, the user can select the moving image to be retrieved from the date selection screen.

Figure 19:
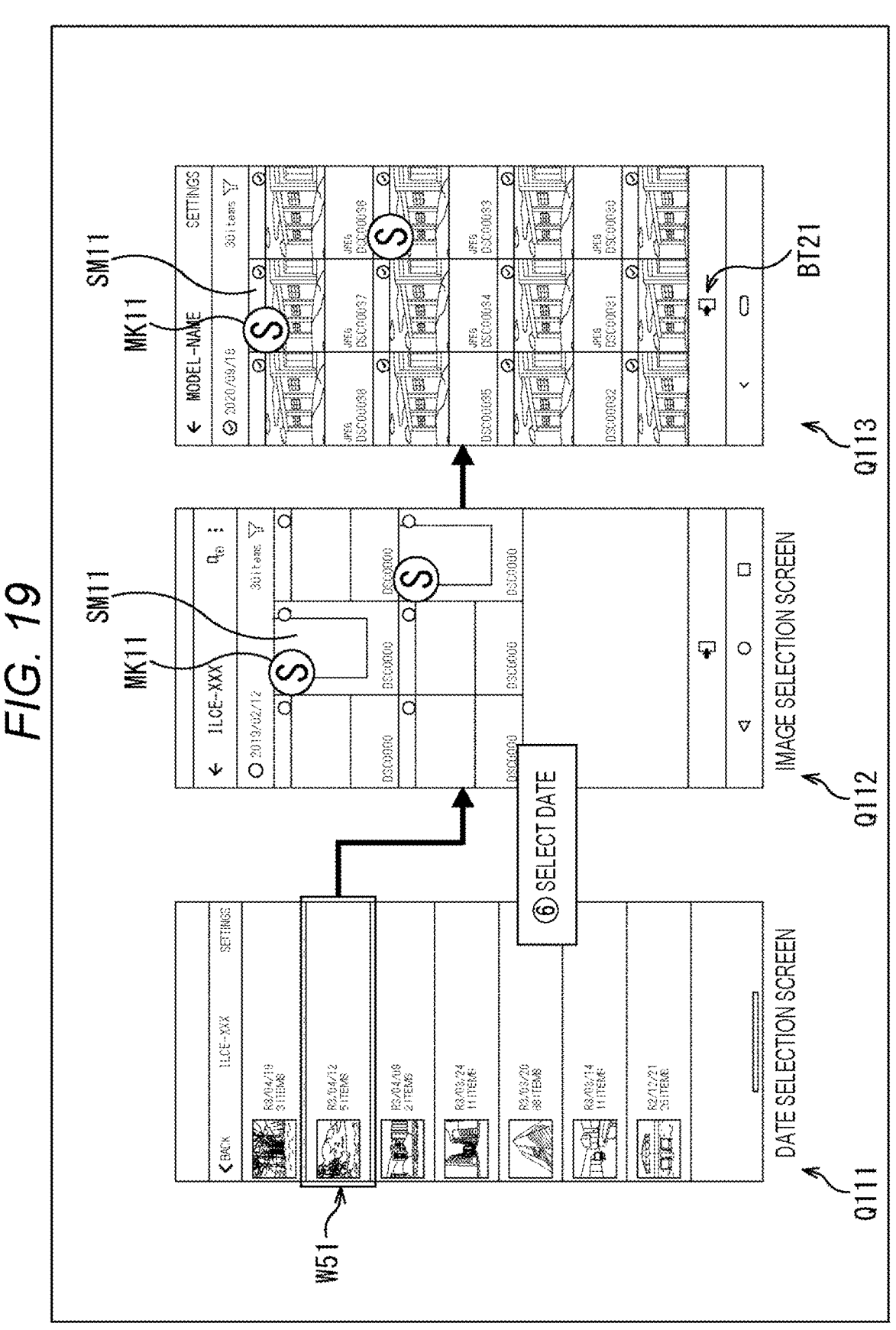
FIG. 19 is a diagram for explaining the retrieval of a moving image.

Specifically, for example, as indicated by arrow Q111 in FIG. 19, while the date selection screen is displayed on the information processing apparatus, the user selects the date on which the moving image to be retrieved was captured from the list of dates displayed on the date selection screen. Note that the date selection screen indicated by arrow Q111 is the same as the date selection screen indicated by arrow Q102 in FIG. 18.

For example, when a desired date field W51 is selected from the list of dates on the date selection screen indicated by arrow Q111, an image selection screen indicated by arrow Q112 is displayed on the information processing apparatus.

In this example, the image selection screen indicated by arrow Q112 displays a list of images in which the date indicated by the date field W51 selected on the date selection screen indicated by arrow Q111 is the image capturing date.

In the list of the images, a list of thumbnail images of a plurality of moving images, including a thumbnail image SM11 of the moving image, is displayed. For example, a mark MK11, which indicates that a shot mark has been provided to a moving image corresponding to the thumbnail image SM11, is displayed on the thumbnail image SM11.

For example, as indicated by arrow Q113, the user selects an image to be retrieved from the images displayed in the list on the image selection screen, more specifically, the thumbnail images. Here, the user specifies a thumbnail image of an image (moving image) and causes a checkmark to be displayed on the specified thumbnail image, thereby selecting a moving image to be retrieved.

Note that a moving image to be retrieved can also be selected on the imaging apparatus 11 side. In such a case, an image selection screen is displayed on the display unit 55 of the imaging apparatus 11.

When selecting a moving image to be retrieved, the user operates (presses) a retrieval button BT21 and instructs to retrieve the selected moving image.

Figure 20:
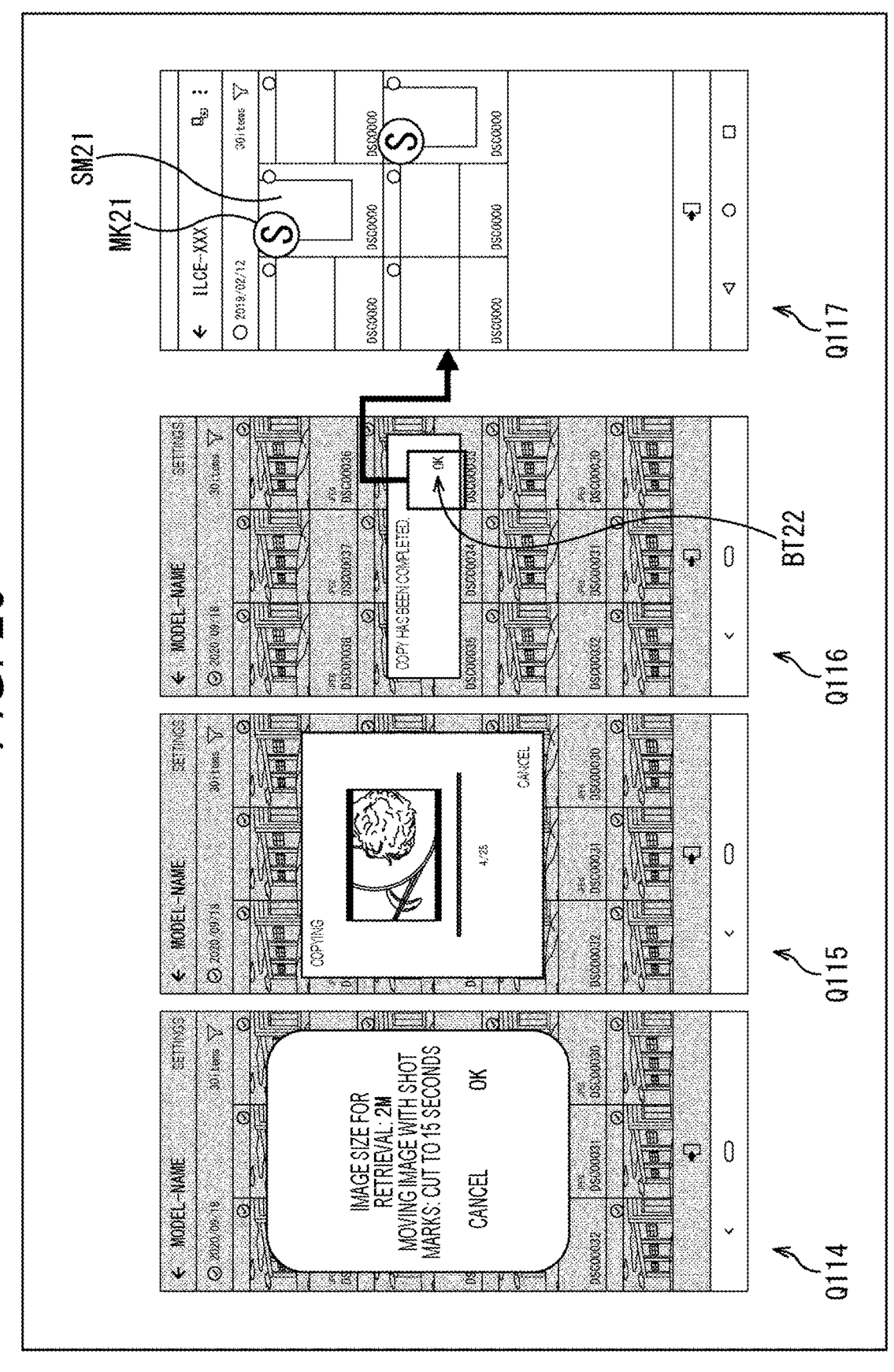
FIG. 20 is a diagram for explaining the retrieval of a moving image.

When the retrieval button BT21 is operated, a dialog indicated by arrow Q114 in FIG. 20 is displayed on the information processing apparatus, for example.

In this example, the dialog displays the total size of the moving image to be retrieved and the trimmed section length of the retrieved moving image, and also displays a button displaying characters "OK" and a button displaying the characters "CANCEL".

For example, when the user operates a button displaying the characters "CANCEL", the retrieval of the moving image is canceled.

Furthermore, when the user operates the button displaying the characters "OK", the retrieval of the moving image is started, and the information processing apparatus displays a progress display screen indicating that retrieval is being performed, for example, as indicated by arrow Q115. In this example, the thumbnail image of the moving image having been retrieved (retrieved moving image), characters indicating the degree of progress of retrieving the moving image, a cancel button for canceling the retrieval of the moving image, and the like are displayed on the progress display screen indicated by arrow Q115.

Thereafter, when the retrieval of the moving image is completed, a retrieval completion dialog indicated by arrow Q116 is displayed on the information processing apparatus, for example.

Then, when the user presses (operates) a button BT22 displaying the characters "OK" on the retrieval completion dialog, a list of the moving images retrieved, that is, the retrieved moving images, is displayed on the information processing apparatus as indicated by arrow Q117, for example. In this example, the thumbnail images of the respective retrieved moving images are displayed side by side as the list of the retrieved moving images.

For example, a thumbnail image SM21 represents one retrieved moving image, and a mark MK21 indicating a moving image trimmed from the original moving image is displayed on the thumbnail image SM21. The retrieved moving image corresponding to the thumbnail image SM21 is a moving image obtained by trimming a trimmed section for 15 seconds including the position of the shot mark in the original moving image.

Note that the display screen at the time of retrieving the retrieved moving image is not limited to the examples illustrated in FIGS. 18 to 20, and may be any other type of display.

In the following, another display screen example at the time of retrieving the retrieved moving image will be described with reference to FIGS. 21 to 23. Note that, in FIG. 21 or 23, portions corresponding to those in FIG. 19 or 20 are denoted by the same reference numerals, and the description thereof will be omitted as appropriate.

Figure 21:
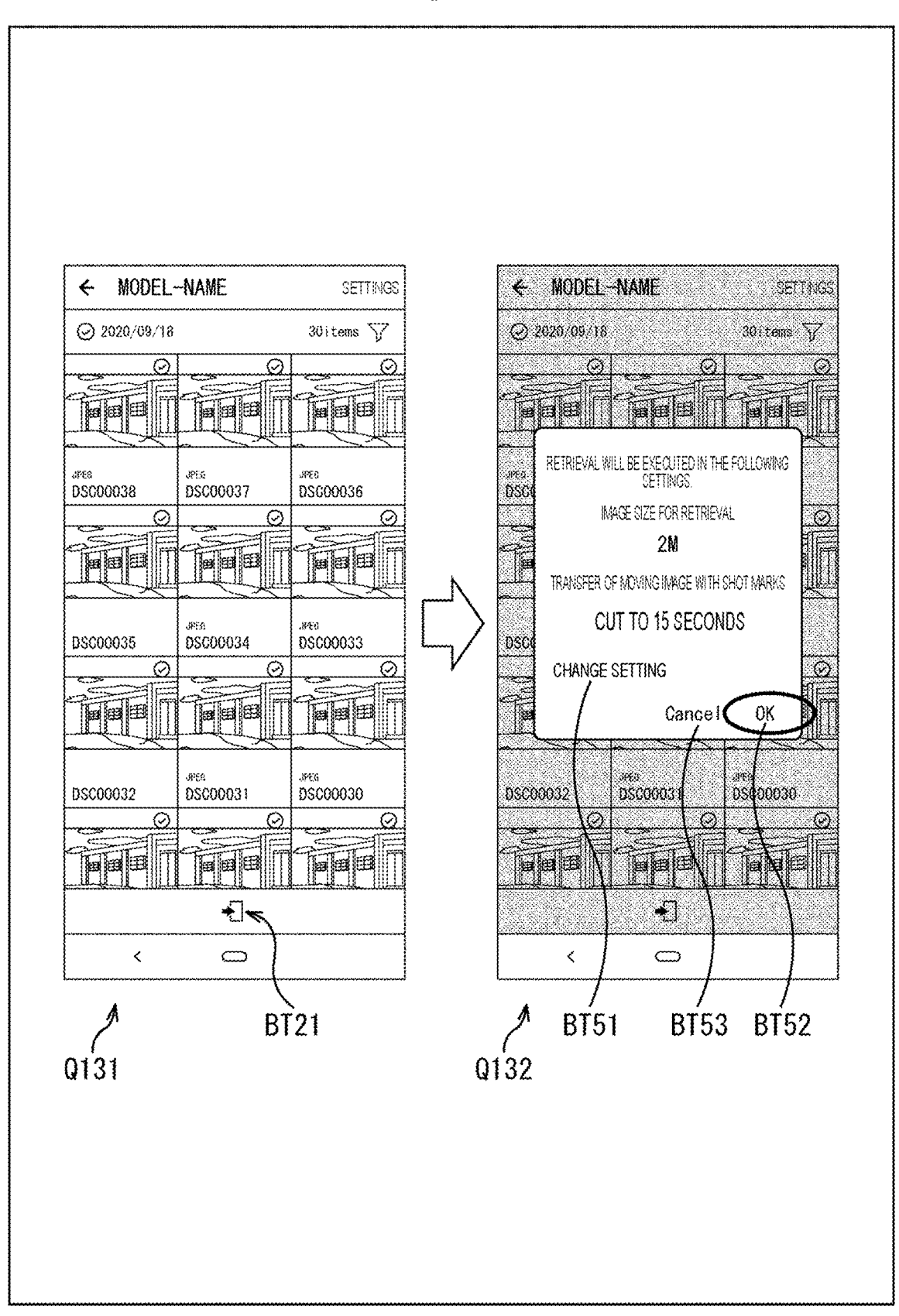
FIG. 21 is a diagram for explaining the retrieval of a moving image.

In this example, for example, when a desired data field is selected from the list of dates on the date selection screen illustrated in FIG. 19, an image selection screen indicated by arrow Q131 in FIG. 21 is displayed on the information processing apparatus. This image selection screen is similar to the image selection screen indicated by arrow Q113 in FIG. 19.

When the user selects an image to be retrieved from the images (thumbnail images) displayed as a list on the image selection screen indicated by arrow Q131, the user operates the retrieval button BT21 to instruct to retrieve the selected moving image.

Then, for example, a dialog indicated by arrow Q132 is displayed on the information processing apparatus.

In this example, the contents of settings related to the retrieved moving image are displayed in the dialog, and the user can check the contents of the settings related to the retrieved moving image before starting retrieving (transferring) the moving image. Specifically, the characters "2M" indicating the total size of the moving image to be retrieved and the characters "CUT TO 15 SECONDS" indicating the trimmed section length of the retrieved moving image are displayed in the dialog indicated by arrow Q132.

In addition, the dialog is also provided with a setting change button BT51 for changing the content of the setting related to the retrieved moving image.

Figure 22:
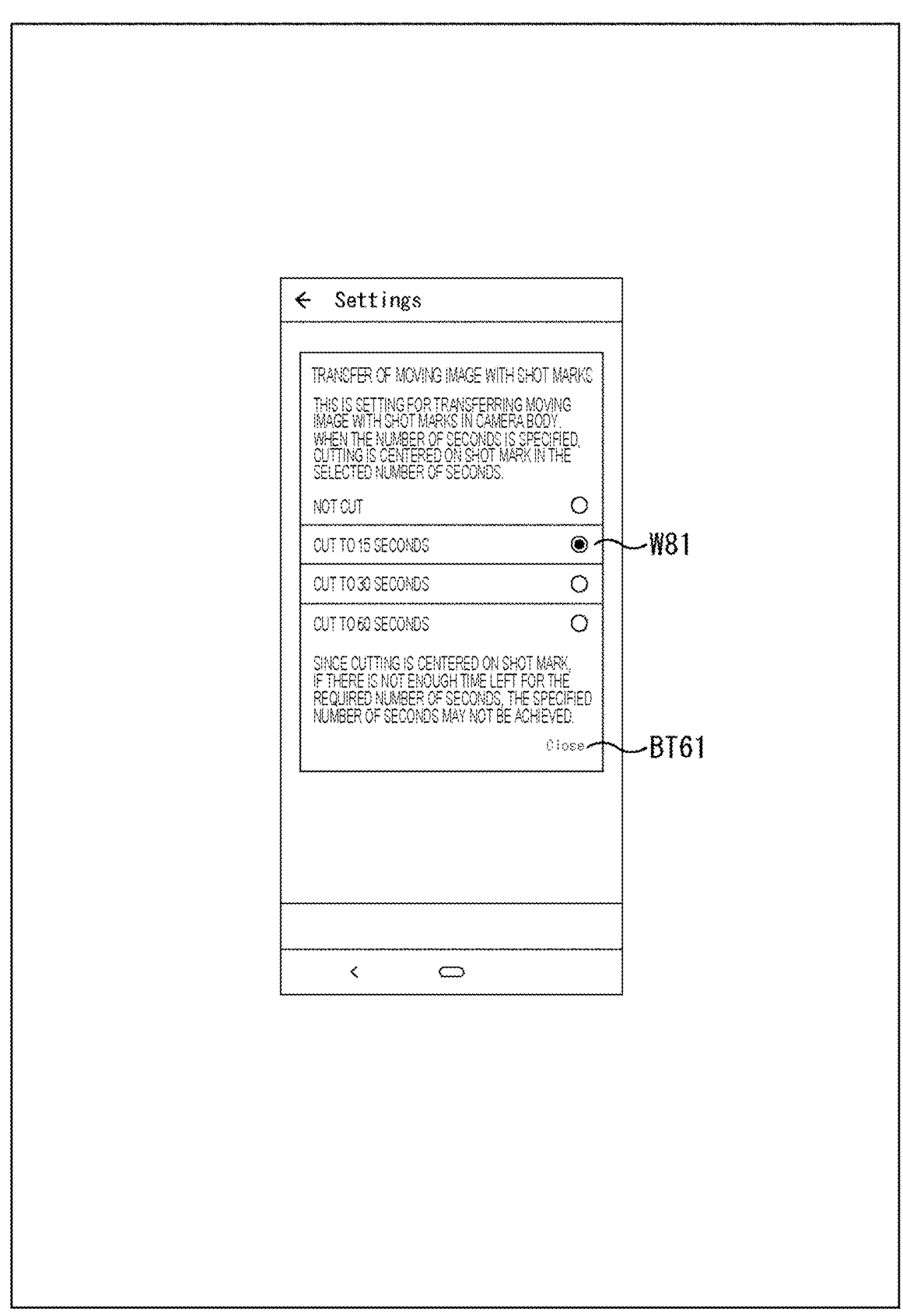
FIG. 22 is a diagram for explaining the retrieval of a moving image.

When the user operates the setting change button BT51, for example, the setting screen illustrated in FIG. 22 is displayed on the display screen of the information processing apparatus. This setting screen is similar to the selection screen indicated by arrow Q104 in FIG. 18.

A plurality of selection items for specifying the trimmed section length is displayed on the setting screen illustrated in FIG. 22, and the user specifies the trimmed section length by selecting one of the plurality of selection items. That is, the setting related to the trimmed section length is changed as the setting related to the retrieved moving image.

In this example, a selection item W81 for specifying "15 seconds" as the trimmed section length has been selected, and a mark indicating the selection is displayed in the selection item W81.

Upon specifying the trimmed section length, the user operates a close button BT61 for closing the setting screen. Then, the setting screen illustrated in FIG. 22 is closed, and the display of the information processing apparatus returns to the dialog indicated by arrow Q132 in FIG. 21.

Returning to the description of FIG. 21, an OK button BT52 for starting the retrieval of the moving image and a cancel button BT53 for canceling the retrieval of the moving image are also provided in the dialog indicated by arrow Q132.

Figure 23:
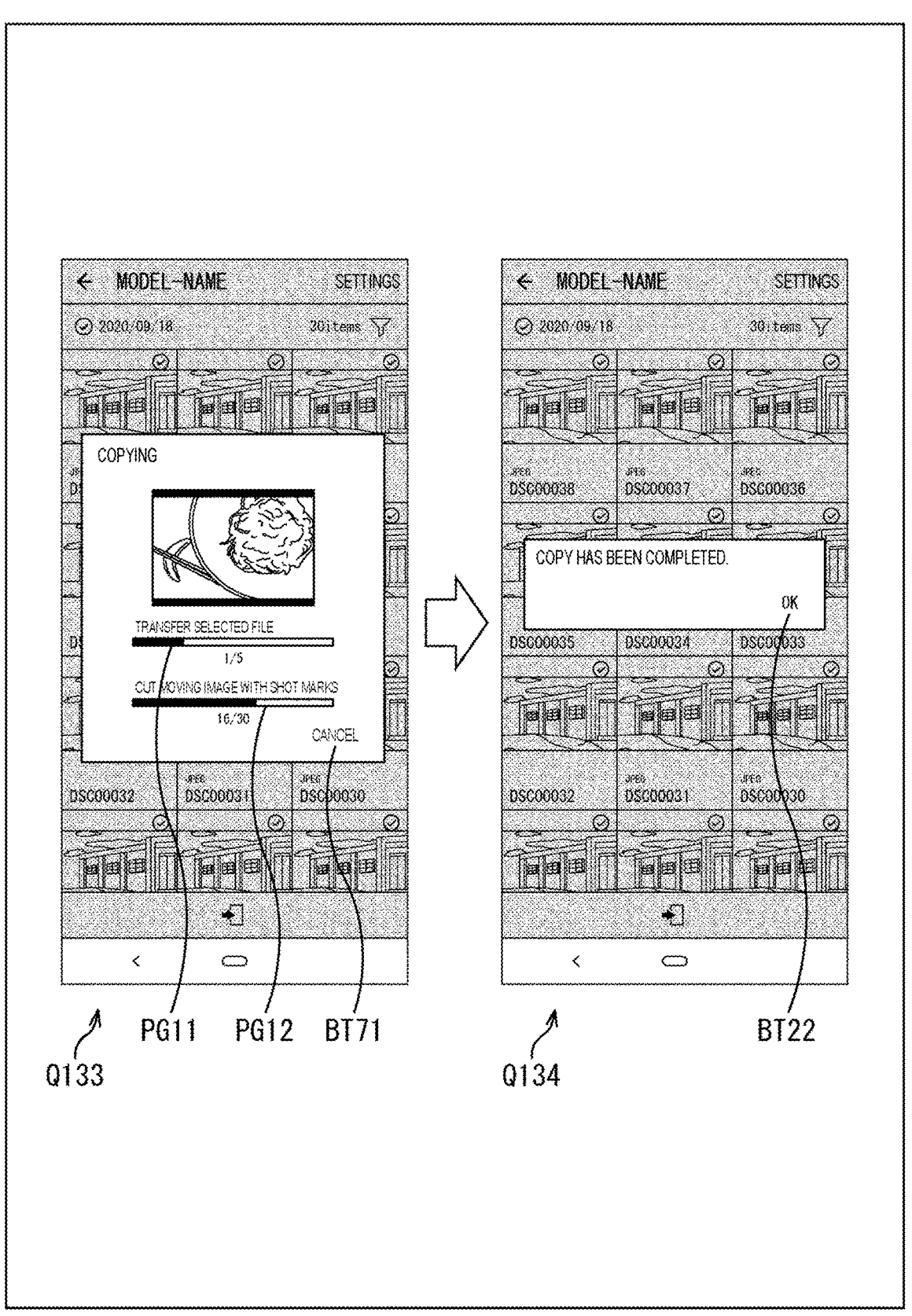
FIG. 23 is a diagram for explaining the retrieval of a moving image.

When the user operates (presses) the OK button BT52, the retrieval of the moving image (retrieved moving image) is started, and a progress display screen indicating that retrieval is being performed as indicated by arrow Q133 in FIG. 23 is displayed on the information processing apparatus, for example. This progress display screen corresponds to the progress display screen indicated by arrow Q115 in FIG. 20, and is an example of the progress display screen particularly in a case where a moving image provided with shot marks is captured.

On the progress display screen indicated by arrow Q133 in FIG. 23, a message "COPYING" indicating that the moving image is being retrieved (being transferred) is displayed, and the thumbnail image of the moving image being retrieved (retrieved moving image) is also displayed.

In addition, a progress bar PG11 and a progress bar PG12 indicating the degree of progress of retrieving the retrieved moving image are also displayed on the progress display screen.

The progress bar PG11 indicates the degree of progress of retrieving the retrieved moving images when all the moving images to be retrieved are targeted.

In particular, the characters "1/5" displayed below the progress bar PG11 in the figure indicate that the total number of files of the original moving images (moving image files) selected on the image selection screen illustrated in FIG. 21 and set as the retrieval target is five, and the first moving image among these five moving images is being retrieved.

Note that the total number of files indicates the sum of the number of moving images provided with shot marks and the number of moving images not provided with shot marks, which have been set as the retrieval target. In the following, the original moving image (moving image file) selected as the retrieval target on the image selection screen is also referred to as a selected file.

In addition, the progress bar PG12 indicates the degree of progress of retrieving the selected file when one selected file currently being retrieved among the five selected files indicated by the total number of files is targeted.

In particular, the characters "16/30" displayed below the progress bar PG12 in the figure indicate that 30 shot marks are provided to one selected file (moving image) on which processing related to retrieval is currently being performed, and 30 retrieved moving images will be retrieved by being trimmed (generated) from the one selected file.

Furthermore, the characters "16/30" also indicate that, among the 30 retrieved moving images trimmed from one selected file, 16 retrieved moving images have been trimmed at the present time, and the retrieval (download) of the 16 retrieved moving images has been completed (or the sixteenth retrieved moving image has been retrieved).

When the currently performed retrieval of the first selected file is completed, the retrieval of the second selected file is started, and the characters "1/5" displayed below the progress bar PG11 are updated to "2/5".

Then, the characters "16/30" displayed below the progress bar PG12 are also updated (reset). For example, in a case where 30 shot marks are provided to the second selected file (moving image), the display below the progress bar PG12 becomes "0/30" or "1/30".

Moreover, the progress display screen is also provided with a cancel button BT71 for canceling the retrieval of the retrieved moving image.

By causing such a progress display screen to be displayed, the user can intuitively grasp the degree of progress of retrieving the retrieved moving image.

When the moving image (retrieved moving image) is retrieved while the progress display screen indicated by arrow Q133 is displayed, and the retrieval is completed, for example, a retrieval completion dialog indicated by arrow Q134 is displayed on the information processing apparatus. The retrieval completion dialog is the same as the retrieval completion dialog indicated by arrow Q116 in FIG. 20.

When the user presses (operates) the button BT22 on the retrieval completion dialog, the list of the retrieved moving images indicated by arrow Q117 in FIG. 20 is displayed on the information processing apparatus, for example.

Meanwhile, there is also an imaging apparatus 11 that does not have a partial transfer function to trim and transfer a partial section of a moving image provided with shot marks (hereinafter also referred to as a moving image with shot marks), as described above, as a retrieved moving image. That is, depending on the model or the like, the imaging apparatus 11 may not support the partial transfer function.

In addition, depending on the version or the like of a dedicated application installed on an information processing apparatus such as a smartphone, the dedicated application may not support the partial transfer function.

Here, that the imaging apparatus 11 supports the partial transfer function means that, for example, a menu related to setting the shot mark provision, the trimmed section length, and the like is displayed, and a shot mark can be provided as illustrated in FIGS. 16 and 17. Conversely, the imaging apparatus 11, which does not display the menu related to setting the shot mark provision, the trimmed section length, and the like and cannot provide the shot mark, is considered not to support the partial transfer function.

Furthermore, for example, that the dedicated application supports the partial transfer function means that the button BT12 and the selection screen on the setting screen illustrated in FIG. 18 are displayed in the dedicated application, and the trimmed section length can be specified. Conversely, when the button BT12 or the selection screen is not displayed, that is, when the button BT12 or the selection screen has been set to hidden, and the trimmed section length cannot be specified, it is determined that the dedicated application does not support the partial transfer function.

The behavior for each combination of whether or not the imaging apparatus 11, that is, the camera body, supports the partial transfer function and whether or not the dedicated application supports the partial transfer function is as illustrated in FIG. 24, for example.

In the example of FIG. 24, in a case where the imaging apparatus 11 side (camera side) supports the partial transfer function and the dedicated application side also supports the partial transfer function, the retrieved moving image is trimmed (cut) from the moving image provided with shot marks at the time of retrieval as described above.

In contrast, in a case where the imaging apparatus 11 side supports the partial transfer function but the dedicated application does not support the partial transfer function, the dedicated application side cannot make a setting related to the partial transfer. Thus, at the time of retrieval, the retrieved moving image is not trimmed (not cut) from the moving image with shot marks. In this case, for example, the moving image with shot marks is retrieved (transferred) as one retrieved moving image as it is.

Furthermore, in a case where the imaging apparatus 11 side does not support the partial transfer function and the dedicated application side supports the partial transfer function, the imaging apparatus 11 side does not have a menu related to partial transfer and cannot provide a shot mark, so that the retrieved moving image is not trimmed from the moving image.

In this case, for example, on the dedicated application side, the button BT12 and the selection screen on the setting screen illustrated in FIG. 18 are hidden, and the moving image is retrieved as one retrieved moving image as it is.

Moreover, in a case where the imaging apparatus 11 side does not support the partial transfer function and the dedicated application side also does not support the partial transfer function, the retrieved moving image is not trimmed from the moving image.

In a case where the imaging apparatus 11 supports the partial transfer function, the imaging apparatus 11 notifies the information processing apparatus (smartphone) side of flag information indicating its support of the partial transfer function.

Therefore, the information processing apparatus side supporting the partial transfer function can specify whether or not the imaging apparatus 11 as the retrieval source (transfer source) of the retrieved moving image supports the partial transfer function on the basis of the presence or absence of the flag information from the imaging apparatus 11.

Figure 25:
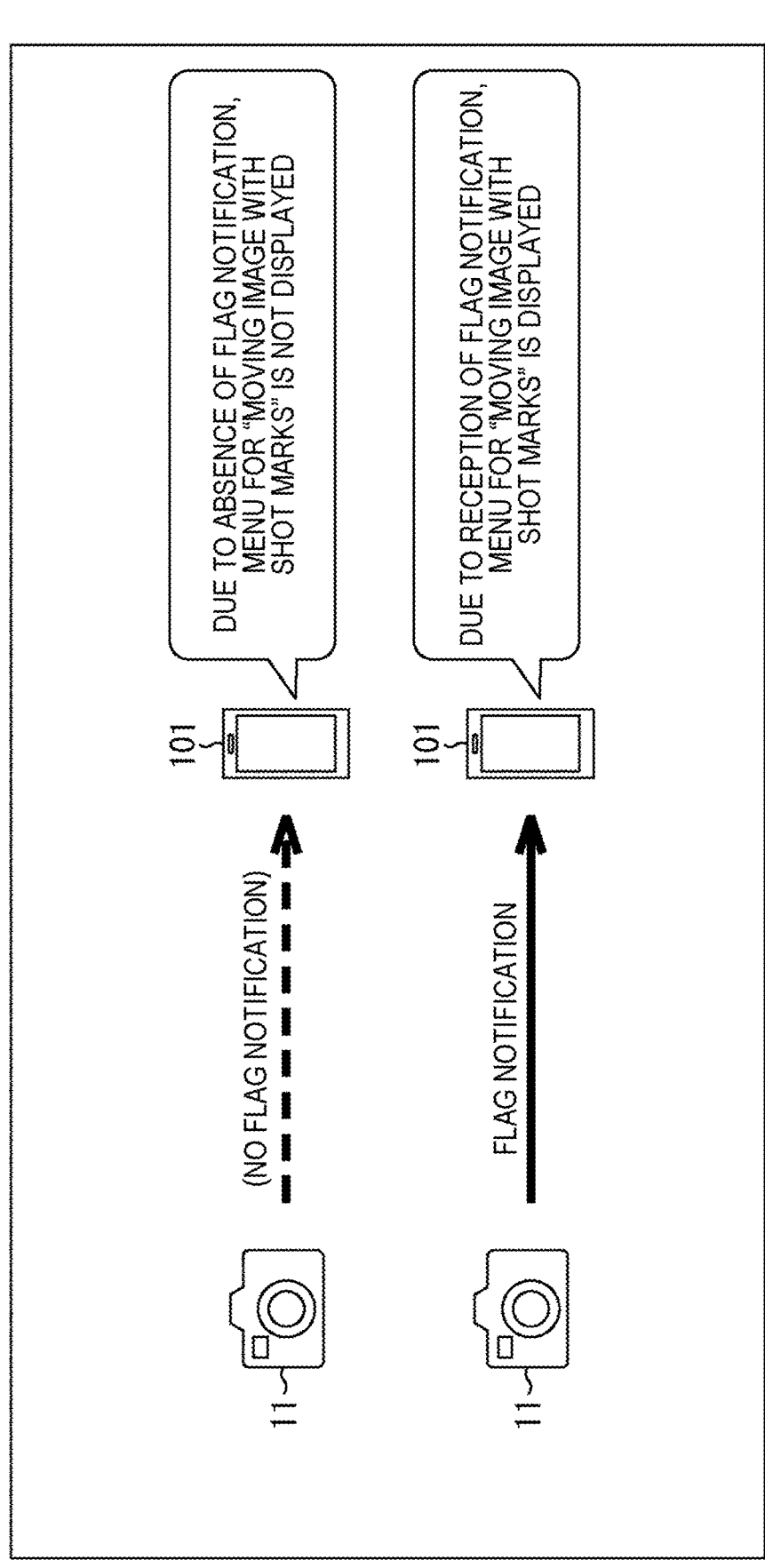
FIG. 25 is a diagram for explaining behavior when a moving image is retrieved.

For example, as illustrated in FIG. 25, it is assumed that the imaging apparatus 11 and an information processing apparatus 101, such as a smartphone, on which a dedicated application corresponding to the partial transfer function is installed are connected in a wired or wireless manner.

In this case, for example, as illustrated on the upper side in the figure, in a case where the imaging apparatus 11 does not support the partial transfer function, the flag information is not notified (transmitted) from the imaging apparatus 11 to the information processing apparatus 101. When there is no notification of flag information from the imaging apparatus 11, the information processing apparatus 101 determines that the imaging apparatus 11 side does not support the partial transfer function, and does not display a menu related to a moving image with shot marks, that is the partial transfer function. Specifically, for example, the button BT12 and the selection screen on the setting screen illustrated in FIG. 18 are hidden.

In contrast, for example, as illustrated on the lower side in the figure, when the imaging apparatus 11 supports the partial transfer function, the flag information is notified (transmitted) from the imaging apparatus 11 to the information processing apparatus 101. When the flag information is notified from the imaging apparatus 11, the information processing apparatus 101 determines that the imaging apparatus 11 side supports the partial transfer function, and displays the menu related to a moving image with shot marks. Specifically, for example, the button BT12 and the selection screen on the setting screen illustrated in FIG. 18 are displayed.

According to the partial transfer function as described above, the user can easily obtain the retrieved moving image obtained by trimming only a portion of the retrieved moving image that the user considers good. That is, the usability of the imaging apparatus 11 and the information processing apparatus 101 can be improved.

<Description of Mode Transition Process>

Next, the operation of the imaging apparatus 11 described above will be described.

Figure 26:
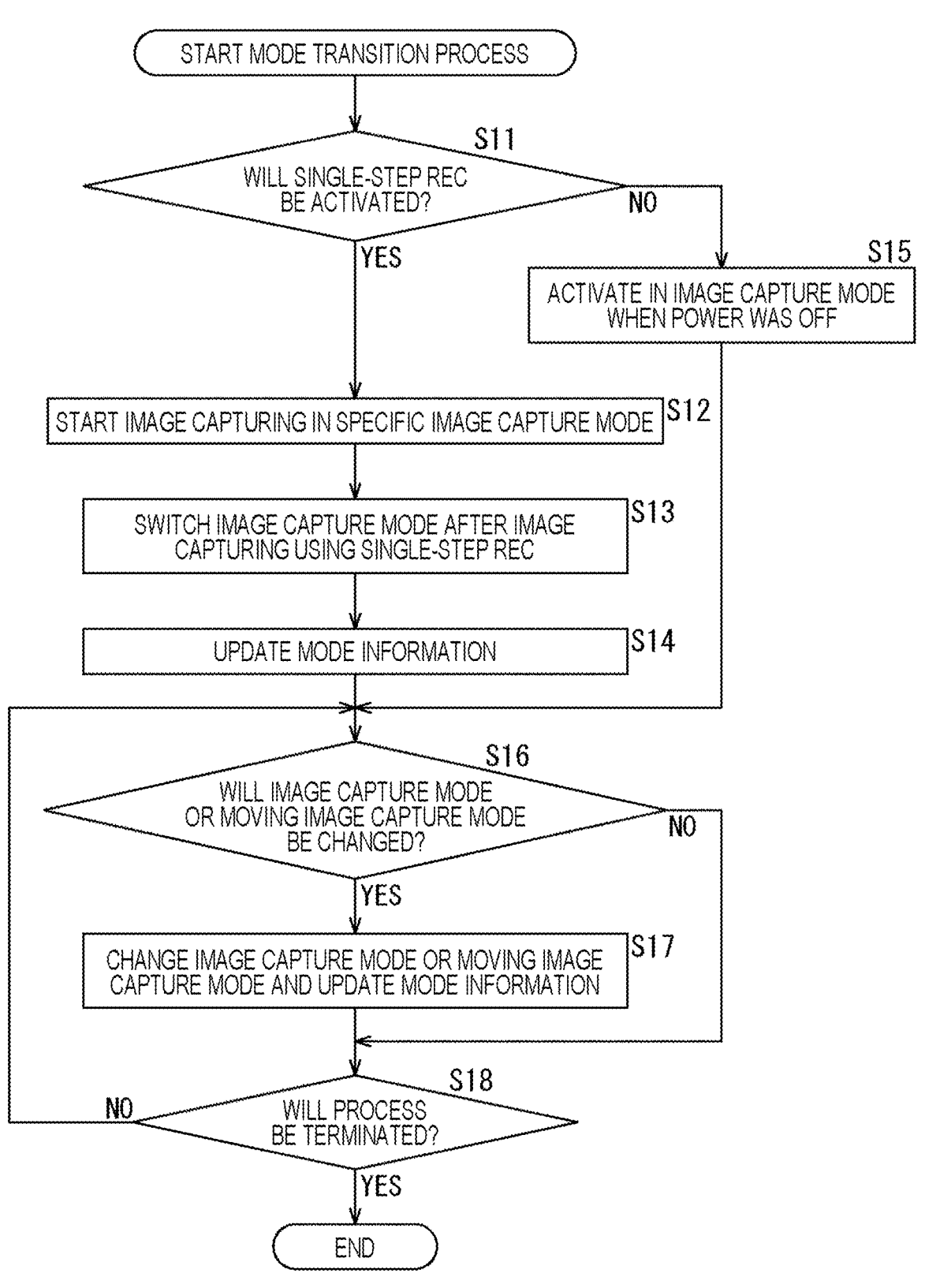
FIG. 26 is a flowchart for explaining a mode transition process.

First, a mode transition process, which is started when the power button 26 or the REC button 25 is operated with the imaging apparatus 11 in the powered-off state, will be described with reference to a flowchart in FIG. 26.

In step S11, the camera control unit 58 determines whether or not to activate the single-step REC on the basis of the signal supplied from the power button 26 or the REC button 25 as the operation unit 57.

For example, in step S11, it is determined to activate the single-step REC in a case where the REC button 25 is operated with the imaging apparatus 11 in the powered-off state, the single-step REC function is set to on (enabled) in the menu setting, and the function assigned to the REC button 25 in the moving image mode is a mode for moving image capturing.

Furthermore, for example, it is determined not to activate the single-step REC in a case where the power button 26 is operated with the imaging apparatus 11 in the powered-off state, or in a case where the single-step REC function is set to off (disabled) in the menu setting.

In a case where it is determined in step S11 to activate the single-step REC, in step S12, the camera control unit 58 turns on the power of the imaging apparatus 11, and at the same time, starts image capturing in a specific image capture mode on the basis of the mode information recorded in the memory unit 59.

For example, in a case where the single-step REC is activated in the activation pattern BP1 described above, the camera control unit 58 starts capturing a moving image using the image capture mode and image capturing setting values indicated by the power-off mode information included in the mode information. In other words, the camera control unit 58 sets the image capture mode to the image capture mode indicated by the power-off mode information.

However, in a case where the image capture mode indicated by the power-off mode information is the still image mode, it is determined that the direct REC function is activated, and image capturing is performed in the moving image mode.

In addition, for example, in a case where the single-step REC is activated in the activation pattern BP2 described above, it is assumed that the image capture mode indicated by the power-off mode information is the still image mode or the moving image mode. In such a case, similarly to the case of the activation pattern BP1, the camera control unit 58 starts capturing a moving image using the image capture mode and image capturing setting values indicated by the power-off mode information.

On the other hand, it is assumed that the image capture mode indicated by the power-off mode information is the S&Q mode in the case where the single-step REC is activated in the activation pattern BP2. In such a case, the camera control unit 58 starts capturing a moving image using the moving image capture mode and image capturing setting values indicated by the moving image capture mode information, or using an auto mode such as a preset blur-priority auto mode.

Moreover, for example, in a case where the single-step REC is activated in the activation pattern BP3 described above, the camera control unit 58 starts capturing a moving image using the moving image capture mode and image capturing setting values indicated by the moving image capture mode information, or using an auto mode such as a preset blur-priority auto mode.

When the capturing of a moving image is started, for example, the camera control unit 58 appropriately determines each of parameters constituting image capturing setting values on the basis of a signal from the operation unit 57, image data from the imaging element 52 or the camera signal processing unit 53, sensor information (distance information and illuminance information) from the sensor unit 61, and the like, and performs various controls related to image capturing. More specifically, for determining each parameter constituting the image capturing setting value, the image capture mode, the moving image capture mode, the on/off status of the depth switching function, and the like are also considered.

For example, the camera control unit 58 controls the driver unit 60 on the basis of the lens movement amount determined from the image data and the like, the F value as a parameter constituting the determined image capturing setting value, and the like, and causes the driver unit 60 to drive the motor constituting the lens system 51. Thus, focus control, aperture adjustment, and the like are performed.

Furthermore, the camera control unit 58 controls the imaging element 52 according to necessary ones among the exposure correction value, the shutter speed, the ISO sensitivity, and the like as parameters constituting the determined image capturing setting values, and causes the imaging element to capture a moving image. The imaging element 52 supplies the image data of the moving image obtained by image capturing to the camera control unit 58 and the camera signal processing unit 53.

Furthermore, the camera control unit 58 supplies necessary ones among the exposure correction value, the ISO sensitivity, the white balance setting value, and the like as parameters constituting the determined image capturing setting values, selection results of the creative look and the picture effect, and the like to the camera signal processing unit 53, and controls the execution of various types of signal processing.

The camera signal processing unit 53 appropriately performs, as various types of signal processing, gain adjustment processing for adjusting brightness, white balance adjustment processing, filtering processing for the creative look and the picture effect, and the like on the image data supplied from the imaging element 52.

The camera signal processing unit 53 supplies image data obtained by various types of signal processing to the recording control unit 54 to record the image data on a recording medium (not illustrated), supplies image data for display to the display unit 55 to display a moving image, and supplies image data to the camera control unit 58.

In addition, when the user presses the REC button 25 after the image capturing using the single-step REC is started, the camera control unit 58 stops the recording of the image data of the moving image by the recording control unit 54, thereby terminating the capturing of the moving image using the single-step REC.

In step S13, the camera control unit 58 switches the image capture mode as necessary on the basis of the mode information recorded in the memory unit 59 and the signal supplied from the REC button 25 as the operation unit 57 after the image capturing using the single-step REC. In this case, for example, the image capture mode or the moving image capture mode is switched (set) according to any one of the transition patterns TP1 to TP5 described above.

Specifically, for example, in a case where the moving image capture mode is switched according to the transition pattern TP2, the camera control unit 58 transitions the moving image capture mode to the auto mode when the REC button 25 is long-pressed at the termination of single-step REC. That is, the camera control unit 58 changes (sets) the moving image capture mode to the auto mode, and controls the capturing of a moving image in the auto mode.

Furthermore, for example, in a case where the moving image capture mode is switched according to the transition pattern TP3, the camera control unit 58 makes the transition to the image capture mode indicated by the power-off mode information included in the mode information recorded in the memory unit 59. That is, the camera control unit 58 controls each unit of the imaging apparatus 11 to capture an image using the image capture mode and image capturing setting values that are indicated by the power-off mode information and was used immediately before the power was turned off.

In step S14, the camera control unit 58 updates the mode information recorded in the memory unit 59 according to the switching of the image capture mode or the moving image capture mode in step S13.

For example, in a case where the image capture mode is switched in step S13, the camera control unit 58 updates the power-off mode information constituting the mode information. In this case, the camera control unit 58 generates power-off mode information indicating the image capture mode and image capturing setting values after the switching as the updated power-off mode information, and records the power-off mode information in the memory unit 59.

Furthermore, for example, in a case where the moving image capture mode is switched in step S13, the power-off mode information and the moving image capture mode information constituting the mode information are updated according to the switching. Note that, in a case where neither the switching of the image capture mode nor the switching of the moving image capture mode is made in step S13, the process of step S14 is not performed.

When the process of step S14 is performed and the mode information is updated, the process then proceeds to step S16.

Furthermore, for example, in a case where it is determined in step S11 not to activate the single-step REC, the process proceeds to step S15.

In step S15, the camera control unit 58 turns on the power of the imaging apparatus 11, and activates the imaging apparatus 11 in the image capture mode that is indicated by the power-off mode information included in the mode information recorded in the memory unit 59 and was used when the power was turned off.

In this case, even if the imaging apparatus 11 is activated, image recording (capturing) is not started until the REC button 25 or the shutter button 23 is operated.

Furthermore, for example, in a case where the user operates the REC button 25 but it is determined in step S11 not to activate the single-step REC, the subsequent process may not be performed and the mode transition process may be terminated.

When the process of step S14 is performed or the process of step S15 is performed, the process of step S16 is performed.

In step S16, the camera control unit 58 determines whether or not to change the image capture mode or the moving image capture mode on the basis of a signal from the operation unit 57.

For example, the user can change the image capture mode or the moving image capture mode by operating the mode button 24 or the like as the operation unit 57 in a state where the moving image is not being captured or some other states. In step S16, in a case where the user instructs to change (switch) the image capture mode or the moving image capture mode, it is determined to change the image capture mode or the moving image capture mode.

In a case where it is determined in step S16 to change the image capture mode or the moving image capture mode, the process of step S17 is then performed.

In step S17, the camera control unit 58 changes (switches) one of the image capture mode and the moving image capture mode instructed to change by the user according to the user's operation, and updates the mode information recorded in the memory unit 59 according to the change. For example, the mode information is updated similarly to the case in step S14.

Furthermore, in a case where it is determined in step S16 not to change the image capture mode or the moving image capture mode, the process of step S17 is not performed, and the process then proceeds to step S18.

When it is determined in step S16 not to change the image capture mode or the moving image capture mode or the process of step S17 is performed, the camera control unit 58 determines in step S18 whether or not to terminate the process.

For example, in step S18, in a case where the user operates the power button 26 and instructs to turn off the power, it is determined to terminate the process.

In a case where it is determined in step S18 not to terminate the process yet, the process returns to step S16, and the process described above is repeatedly performed.

In contrast, in a case where it is determined in step S18 to terminate the process, the camera control unit 58 stops the process of each unit, and the mode transition process is terminated.

As described above, the imaging apparatus 11 activates the single-step REC according to the user's operation to start image capturing in a specific image capture mode, and switches the image capture mode as appropriate after the image capturing using the single-step REC. Furthermore, the imaging apparatus 11 updates the mode information according to the switching of the image capture mode or the moving image capture mode.

In this way, the user can capture an image in an appropriate image capture mode or moving image capture mode when the single-step REC is activated, after the image capturing using the single-step REC is terminated, or the like, and the usability of the imaging apparatus 11 can be improved.

<Description of Setting Change Process>

Figure 27:
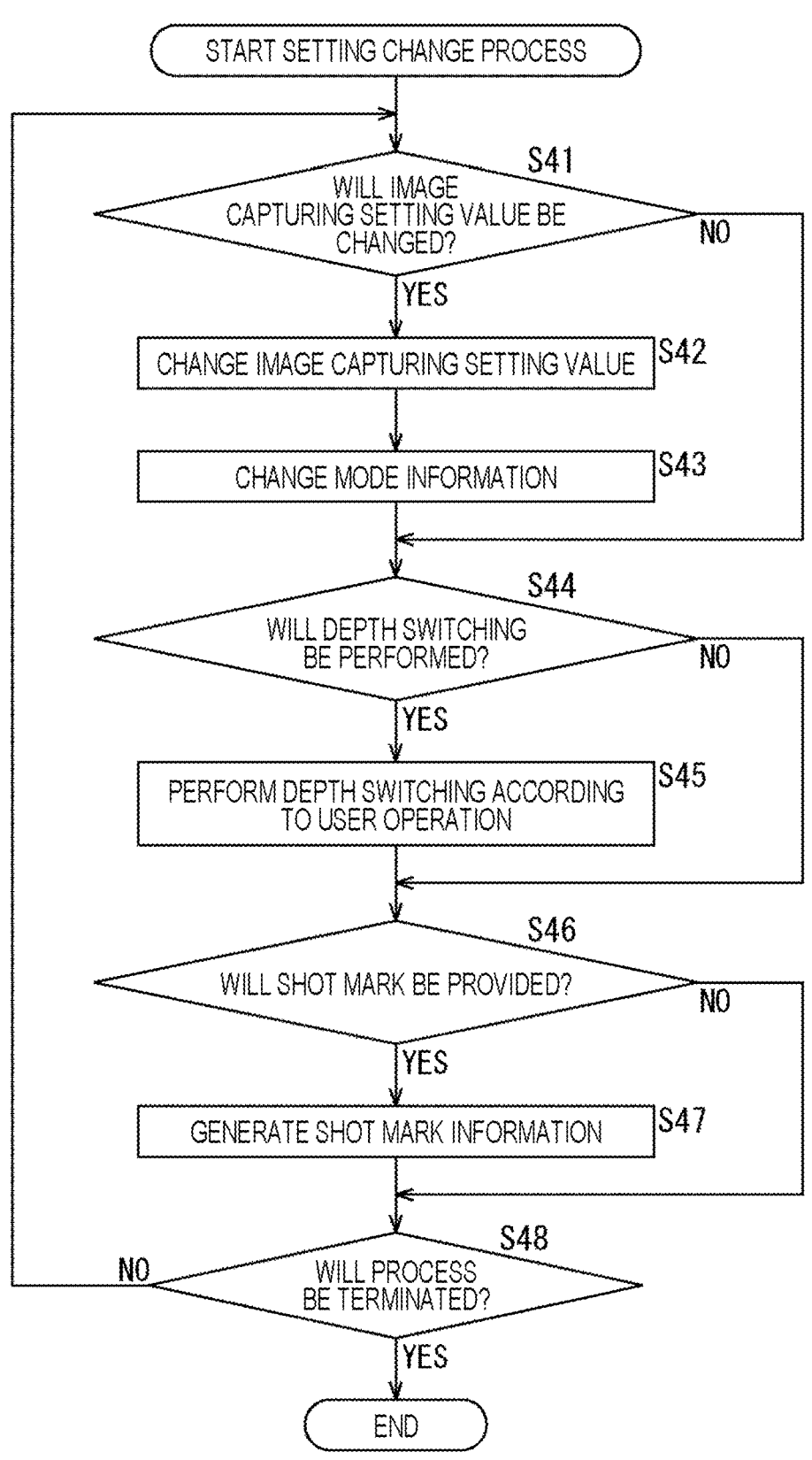
FIG. 27 is a flowchart for explaining a setting change process.

Furthermore, the user can appropriately change the image capturing setting value and the like during the capturing of a moving image or when image capturing is not being performed. A setting change process performed by the imaging apparatus 11 will be described below with reference to the flowchart of FIG. 27. This setting change process is started when the power of the imaging apparatus 11 is turned on, and is performed in parallel with the mode transition process of FIG. 26.

In step S41, the camera control unit 58 determines whether or not to change the image capturing setting value.

For example, during the capturing of a moving image or the like, in a case where the user operates the operation unit 57 to instruct to change the exposure correction value or the like as a parameter constituting the image capturing setting value, it is determined to change the image capturing setting value.

In a case where it is determined in step S41 not to change the image capturing setting value, the processes of steps S42 and S43 are not performed, and the process then proceeds to step S44.

In contrast, in a case where it is determined in step S41 to change the image capturing setting value, the camera control unit 58 changes the image capturing setting value in step S42. For example, the camera control unit 58 appropriately changes parameters constituting the image capturing setting values on the basis of a signal from the operation unit 57, image data from the imaging element 52 or the camera signal processing unit 53, sensor information from the sensor unit 61, and the like.

In step S43, the camera control unit 58 updates the mode information recorded in the memory unit 59 according to the change in image capturing setting value.

When the process of step S43 is performed or it is determined in step S41 not to change the image capturing setting value, the camera control unit 58 determines in step S44 whether or not to perform depth switching on the basis of a signal from the operation unit 57.

For example, in step S44, in a case where the user operates the custom button 27 or the like as the operation unit 57 to which the function to switch the depth of field has been assigned during the capturing of a moving image or the like, it is determined that depth switching is to be performed.

In a case where it is determined in step S44 not to perform the depth switching, the process of step S45 is not performed, and the process then proceeds to step S46.

In contrast, in a case where it is determined in step S44 to perform the depth switching, the camera control unit 58 performs the depth switching according to the user's operation in step S45.

For example, as described with reference to FIGS. 13 to 15, the camera control unit 58 switches between the "blurred state" and the "clear state", switches the "clear state" on and off, and switches the toggle mode on and off on the basis of the signal supplied from the operation unit 57 according to the user's operation.

When the process of step S45 is performed or it is determined in step S44 not to perform depth switching, the camera control unit 58 determines in step S46 whether or not to provide a shot mark on the basis of the signal from the operation unit 57.

For example, in step S46, in a case where the user operates the button or the like of the operation unit 57, to which the shot mark provision function has been assigned, while a moving image is being captured or a captured moving image is being played back, it is determined to provide a short mark.

In a case where it is determined in step S46 not to provide a shot mark, the process of step S47 is not performed, and the process then proceeds to step S48.

In contrast, in a case where it is determined in step S46 to provide a shot mark, the camera control unit 58 generates shot mark information according to the signal from the operation unit 57 in step S47. That is, a shot mark is provided to the moving image.

Upon generating the shot mark information, the camera control unit 58 supplies the shot mark information to the recording control unit 54 to record the shot mark information in association with the moving image. Note that, more specifically, in step S47, the deletion of the provided shot mark, that is, the deletion of the shot mark information, is also appropriately performed according to the user's operation.

When the process of step S47 is performed or it is determined in step S46 that no shot mark is to be provided, the camera control unit 58 determines in step S48 whether or not to terminate the process. For example, in step S48, in a case where the user operates the power button 26 and instructs to turn off the power, it is determined to terminate the process.

In a case where it is determined in step S48 not to terminate the process yet, the process then returns to step S41, and the process described above is repeatedly performed.

In contrast, in a case where it is determined in step S48 to terminate the process, the camera control unit 58 terminates the process of each unit, and the setting change process is terminated.

As described above, the imaging apparatus 11 changes the image capturing setting value, switches the depth, provides a shot mark, and the like according to the user's operation. In this way, it is possible to switch the depth by a simple operation or to trim a desired section of the moving image by a simple operation, and it is possible to improve the usability of the imaging apparatus 11.

<Configuration Example of Information Processing Apparatus>

Figure 28:
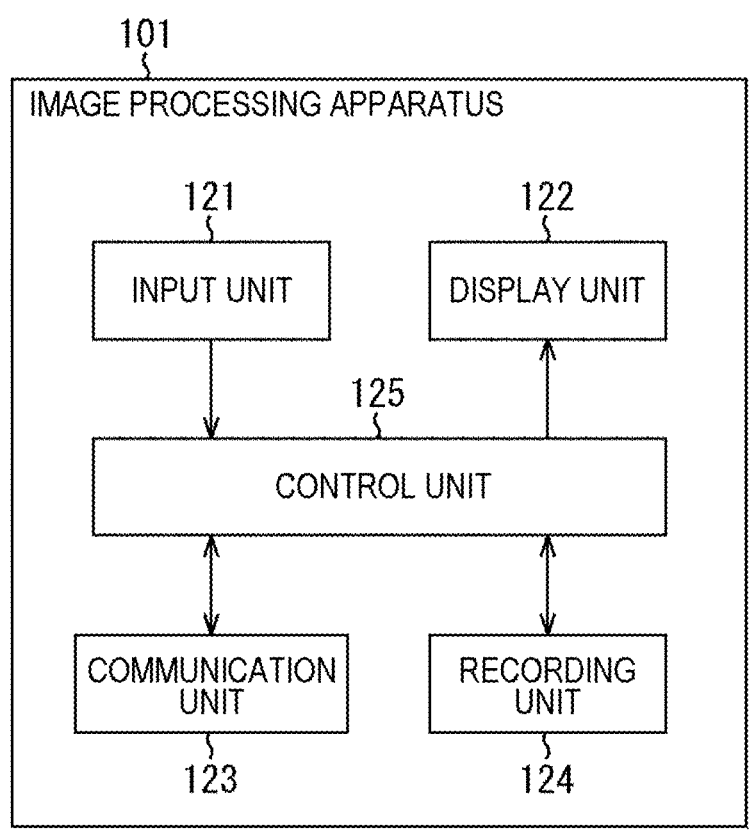
FIG. 28 is a diagram illustrating a configuration example of an information processing apparatus.

Furthermore, the information processing apparatus 101 such as a smartphone connected to the imaging apparatus 11 described with reference to FIG. 25 is configured as illustrated in FIG. 28, for example.

An information processing apparatus 101 illustrated in FIG. 28 includes an input unit 121, a display unit 122, a communication unit 123, a recording unit 124, and a control unit 125.

The input unit 121 includes a touch panel, a switch, a button, and the like superimposed on the display unit 122, and supplies a signal corresponding to the user's operation to the control unit 125. The display unit 122 displays various images under the control of the control unit 125.

The communication unit 123 communicates with an external apparatus such as the imaging apparatus 11. That is, the communication unit 123 transmits the information supplied from the control unit 125 to the imaging apparatus 11, and receives the information transmitted from the imaging apparatus 11 and supplies the information to the control unit 125.

The recording unit 124 records various types of data such as image data and a dedicated application supplied from the control unit 125, and appropriately supplies the recorded data to the control unit 125.

The control unit 125 controls the entire operation of the information processing apparatus 101. For example, the control unit 125 executes the dedicated application recorded in the recording unit 124 to activate a dedicated application and retrieve a moving image from the imaging apparatus 11.

<Description of Image Transmission Process and Retrieve Process>

Figure 29:
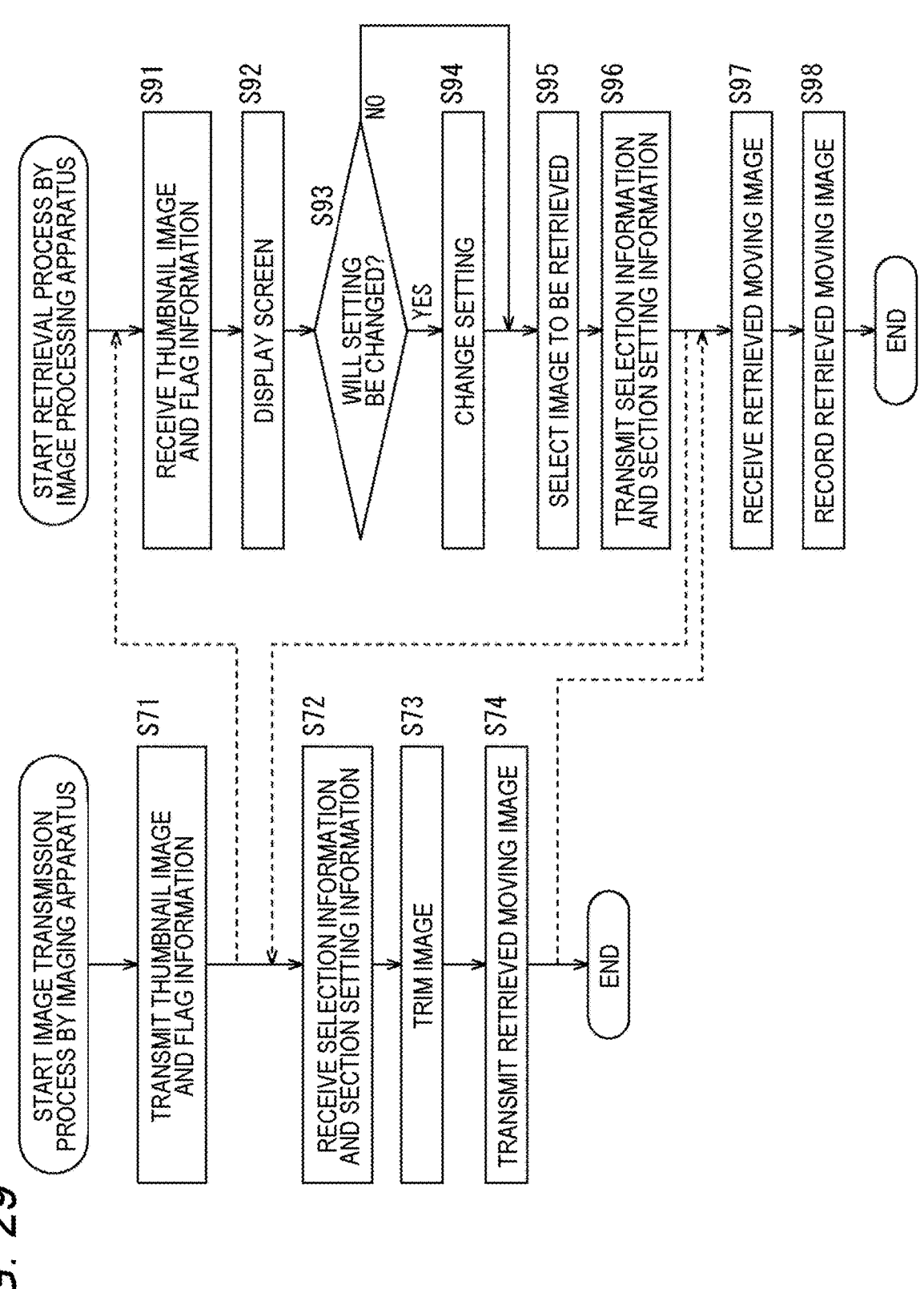
FIG. 29 is a flowchart for explaining an image transmission process and a retrieval process.

Next, the operations of the imaging apparatus 11 and the information processing apparatus 101 when a moving image is retrieved will be described. That is, an image transmission process by the imaging apparatus 11 and a retrieval process by the information processing apparatus 101 will be described below with reference to the flowchart in FIG. 29.

For example, when the control unit 125 of the information processing apparatus 101 activates the dedicated application, causes the display unit 122 to display the main screen illustrated in FIG. 18, and causes the communication unit 123 to establish connection with the imaging apparatus 11, the imaging apparatus 11 starts the image transmission process.

In step S71, the communication unit 56 of the imaging apparatus 11 transmits the thumbnail image and the flag information supplied from the camera control unit 58 to the information processing apparatus 101.

For example, in step S71, the camera control unit 58 appropriately reads the thumbnail image of the moving image from the recording medium (not illustrated) via the recording control unit 54, and supplies the read thumbnail image and the flag information indicating that the partial transfer function is supported to the communication unit 56 for transmission.

Note that, in a case where the imaging apparatus 11 does not support the partial transfer function, the flag information is not transmitted.

In the following description, it is assumed that both the imaging apparatus 11 and the information processing apparatus 101 support the partial transfer function.

When the thumbnail image and the flag information are transmitted, in the information processing apparatus 101, in step S91, the communication unit 123 receives the thumbnail image and the flag information transmitted from the imaging apparatus 11, and supplies those to the control unit 125.

In step S92, the control unit 125 controls the display unit 122 on the basis of the thumbnail image and the flag information supplied from the communication unit 123 and a signal supplied from the input unit 121 according to the user's operation, and causes the display unit 122 to display a screen.

Specifically, for example, the control unit 125 causes the display unit 122 to display the date selection screen, the setting screen, the image selection screen, and the like illustrated in FIG. 18 and the like according to the user's operation.

Note that some of these screens and the like are displayed only in a case where the flag information is received (notified) from the imaging apparatus 11. That is, in a case where the flag information is not transmitted from the imaging apparatus 11, the camera control unit 58 hides the button BT12 and the selection screen on the setting screen.

In step S93, the control unit 125 determines whether or not to make a setting change on the basis of the signal from the input unit 121.

For example, in step S93, in a case where the setting button BT11 is operated by the user while the date selection screen illustrated in FIG. 18 is being displayed, it is determined to make a setting change.

In a case where it is determined in step S93 not to make a setting change, the process of step S94 is not performed, and the process then proceeds to step S95.

In contrast, in a case where it is determined in step S93 to make a setting change, in step S94, the control unit 125 makes a setting change related to the retrieved moving image such as a change in trimmed section length on the basis of the signal from the input unit 121 according to the operation of the user.

When it is determined in step S93 not to make a setting change, or the process of step S94 is performed, the control unit 125 selects an image to be retrieved in step S95.

For example, in a state where the image selection screen illustrated in FIG. 19 or 21 is displayed on the display unit 122, the user operates the input unit 121 to select the thumbnail image corresponding to the moving image to be retrieved. Then, the control unit 125 selects one or more moving images (moving image files) to be retrieved, that is, selected files according to the selection by the user, and generates selection information including images ID indicating these selected files.

Furthermore, the control unit 125 supplies the communication unit 123 with the generated selection information and section setting information indicating the trimmed section length specified in the process of step S94 and the like. Note that the section setting information is not limited to the information indicating the trimmed section length, and may be any information for specifying the trimmed section, such as information indicating the start position and the end position of the trimmed section.

In step S96, the communication unit 123 transmits the selection information and the section setting information supplied from the control unit 125 to the imaging apparatus 11.

Then, the imaging apparatus 11 performs the process of step S72. That is, in step S72, the communication unit 56 receives the selection information and the section setting information transmitted from the information processing apparatus 101 and supplies those to the camera control unit 58.

In step S73, the camera control unit 58 trims an image on the basis of the selection information and the section setting information supplied from the communication unit 56.

That is, the camera control unit 58 reads one or more selected files (moving image files) indicated by the selection information from a recording medium (not illustrated) via the recording control unit 54, thereby obtaining the moving image and the shot mark information stored in the selected files.

In addition, the camera control unit 58 determines the trimmed section for each selected file that has been read, on the basis of the shot mark information and the section setting information. For example, the trimmed section is a section of the trimmed section length indicated by the section setting information centered on the playback time indicated by the shot mark information, that is, the playback time at which the shot mark is provided.

The camera control unit 58 generates the retrieved moving image by trimming (extracting) one or more trimmed sections from the moving image for each selected file that has been read.

Note that, in a case where it is set on the information processing apparatus 101 side not to trim the trimmed section, the moving image stored in the selected file is used as the retrieved moving image as it is. In addition, a moving image not provided with shot marks is also taken as a retrieved moving image as it is.

When the image is trimmed and the retrieved moving image is obtained, the camera control unit 58 supplies the obtained retrieved moving image to the communication unit 56 and starts transferring (transmitting) the retrieved moving image. That is, the camera control unit 58 controls the transfer of the retrieved moving image.

In step S74, the communication unit 56 transmits (transfers) the retrieved moving image supplied from the camera control unit 58 to the information processing apparatus 101, and the image transmission process is terminated. At this time, the communication unit 56 also transmits information such as the total size and the total number of files of the retrieved moving images to be transferred to the information processing apparatus 101 as necessary.

Furthermore, when the transfer (transmission) of the retrieved moving image is started, the information processing apparatus 101 performs the process of step S97.

That is, in step S97, the communication unit 123 receives the retrieved moving image transmitted from the imaging apparatus 11 and supplies the retrieved moving image to the control unit 125.

In step S98, the control unit 125 supplies the retrieved moving image supplied from the communication unit 123 to the recording unit 124 for recording.

At this time, for example, the control unit 125 causes the display unit 122 to display the progress display screen illustrated in FIG. 23 and the like according to the total size and the total number of files of the retrieved moving images supplied from the communication unit 123, the progress status of the transfer of the retrieved moving image, and the like. Then, when the transfer (reception) of all the retrieved moving images, that is, the capturing of the moving images is completed and the retrieval completion dialog is displayed on the display unit 122, the capturing processing is terminated.

As described above, the information processing apparatus 101 selects an image to be retrieved according to the user's operation, and retrieves a moving image from the imaging apparatus 11. Furthermore, the imaging apparatus 11 generates a retrieved moving image in response to a request from the information processing apparatus 101, and transmits the retrieved moving image to the information processing apparatus 101.

In this way, the user can easily obtain the retrieved moving image including a partial section of the captured moving image only by specifying the trimmed section length as necessary. That is, the usability of the imaging apparatus 11 and the information processing apparatus 101 can be improved.

Note that, although an example in which the information processing apparatus 101 side selects a moving image to be retrieved has been described here, it is also possible to select a moving image to be retrieved in the imaging apparatus 11. In such a case, the processes of steps S92 to S95 described above are performed by the camera control unit 58 of the imaging apparatus 11. At this time, the date selection screen, the setting screen, the image selection screen, and the like are appropriately displayed on the display unit 55.

<Configuration Example of Computer>

Note that, the series of processes described above may be executed by hardware or software. In a case where the series of processes is executed by software, a program constituting the software is installed on a computer. Here, the computer includes a computer incorporated in dedicated hardware, a general-purpose computer capable of executing various functions by installing various programs, and the like.

Figure 30:
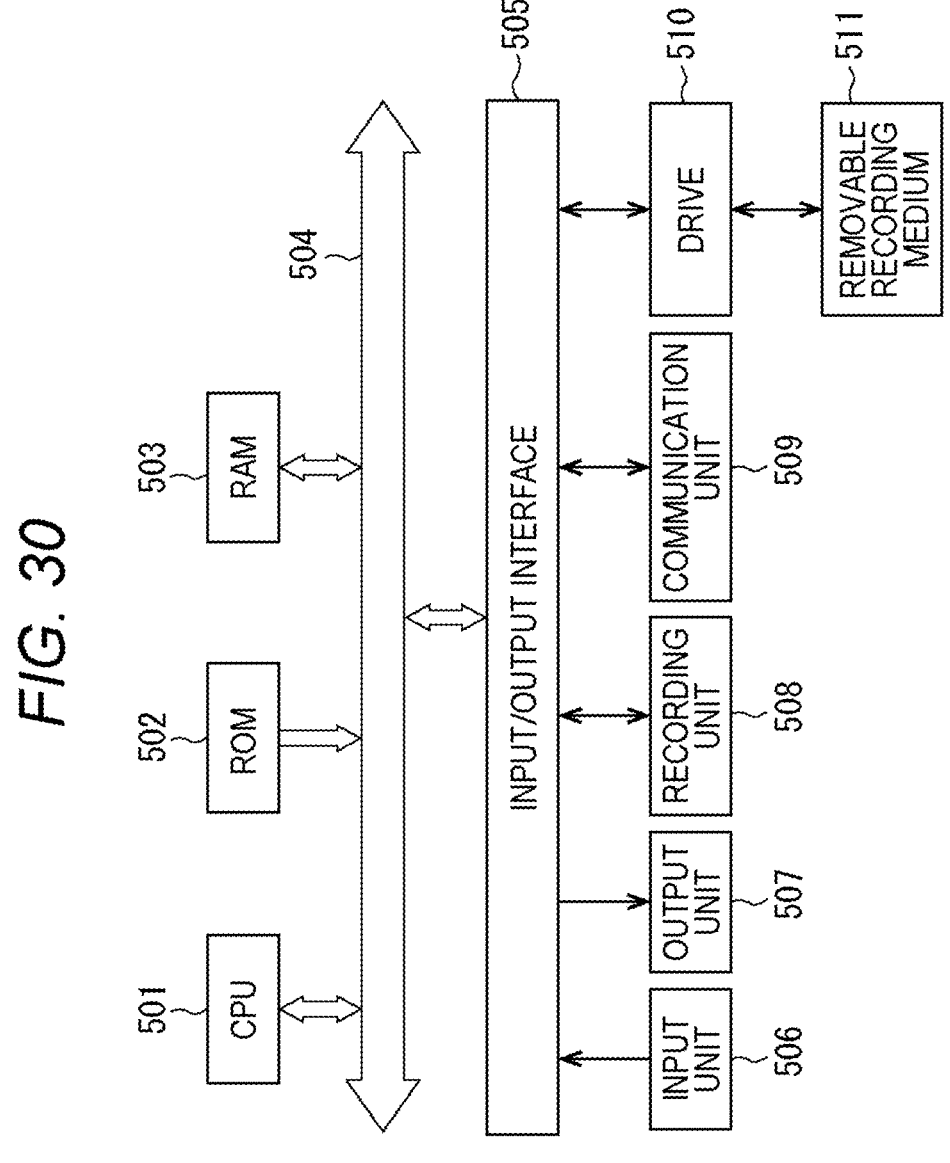
FIG. 30 is a diagram illustrating a configuration example of a computer.

FIG. 30 is a block diagram illustrating a configuration example of hardware of a computer that executes the series of processes described above by a program.

In the computer, a CPU 501, a read-only memory (ROM) 502, and a random-access memory (RAM) 503 are mutually connected by a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes an input switch, a button, a microphone, an imaging element, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input/output interface 505 and the bus 504, and executes the program to perform the series of processes described above.

The program executed by the computer (CPU 501) can be provided by being recorded on the removable recording medium 511 as a package medium and the like, for example. Furthermore, the program may be provided via a wired or wireless transmission medium, such as a local area network, the Internet, or digital satellite broadcasting.

In the computer, the program can be installed in the recording unit 508 via the input/output interface 505 by mounting the removable recording medium 511 on the drive 510. Furthermore, the program can be received by the communication unit 509 via the wired or wireless transmission medium to be installed on the recording unit 508. In addition, the program can be installed in the ROM 502 or the recording unit 508 in advance.

Note that the program executed by the computer may be a program that executes processing in time series in the order described in the present description, or a program that executes processing in parallel or at a necessary timing such as when a call is made.

Furthermore, the embodiment of the present technology is not limited to the embodiments described above, and various modifications may be made without departing from the scope of the present technology.

For example, the present technology may be configured as cloud computing in which a function is shared by a plurality of apparatuses via a network to process together.

Furthermore, each step described in the flowchart described above may be executed by one apparatus, or may be executed in a shared manner by a plurality of apparatuses.

Moreover, in a case where a plurality of processes is included in one step, the plurality of processes included in the one step can be executed by one apparatus or shared and executed by the plurality of the apparatuses.

Moreover, the present technology may also have following configurations.

(1)

An imaging apparatus including a control unit, in which the control unit causes recording of moving image capture mode information that indicates a moving image capture mode last used before power-off of the imaging apparatus, and the control unit causes power-on of the imaging apparatus when a predetermined operation is performed while the imaging apparatus is in a power-off state, and makes a setting to the moving image capture mode indicated by the moving image capture mode information upon activation of a function to start capturing a moving image or after termination of capturing of the moving image due to the activation of the function.

(2)

The imaging apparatus according to (1), in which the control unit causes recording of power-off mode information that indicates the image capture mode last used before the power-off of the imaging apparatus among image capture modes that include a still image mode and a moving image mode in which the moving image is captured in any of one or more of the moving image capture modes, the control unit makes a setting to the moving image capture mode indicated by the moving image capture mode information upon the activation of the function, and the control unit makes a setting to the image capture mode indicated by the power-off mode information after the termination of the capturing of the moving image due to the activation of the function.

(3)

The imaging apparatus according to (1), in which the control unit makes a setting to the moving image capture mode indicated by the moving image capture mode information upon the activation of the function or after the termination of the capturing of the moving image due to the activation of the function.

(4)

The imaging apparatus according to (1), in which the control unit sets the moving image capture mode to an auto mode upon the activation of the function, and the control unit sets the moving image capture mode to the moving image capture mode indicated by the moving image capture mode information after the termination of the capturing of the moving image due to the activation of the function.

(5)

The imaging apparatus according to (4), in which the auto mode is a blur-priority auto mode.

(6)

The imaging apparatus according to (5), in which when the moving image is captured in the blur-priority auto mode, the control unit switches between image capturing in the blur-priority auto mode and image capturing at a preset predetermined F value in accordance with an operation by a user.

(7)

The imaging apparatus according to (6), in which the control unit makes the switching by a toggle method.

(8)

The imaging apparatus according to (5), in which in a case where a predetermined operation unit is operated by a user when the moving image is captured in the blur-priority auto mode, the control unit causes image capturing in a mode capable of alternately switching between performing image capturing at a predetermined first F value and performing image capturing at a preset second F value larger than the first F value.

(9)

The imaging apparatus according to (1), in which in accordance with an image capture mode used when the moving image is captured among image capture modes that include a still image mode and a moving image mode in which the moving image is captured in any of one or more of the moving image capture modes, the control unit determines whether to:

alternately switch between image capturing at a predetermined first F value and image capturing at a preset second F value larger than the first F value in response to an operation on a predetermined operation unit by a user; or alternately switch between enabling or disabling image capturing at the second F value in response to an operation performed on the predetermined operation unit by the user.

(10)

The imaging apparatus according to (1), in which the control unit causes recording of power-off mode information that indicates the image capture mode last used before the power-off of the imaging apparatus, among image capture modes that include a still image mode and a moving image mode in which the moving image is captured in any of one or more of the moving image capture modes, and the control unit determines the image capture mode upon the activation of the function on the basis of the power-off mode information.

(11)

The imaging apparatus according to (1), in which the control unit determines the moving image capture mode after the termination of the capturing of the moving image due to the activation of the function in accordance with an operation performed after the termination of the capturing of the moving image due to the activation of the function.

(12)

The imaging apparatus according to any one of (1) to (11), in which in a case where a setting is made such that a moving image capture function is not assigned to a preset operation unit, the control unit prevents the function from being set to on.

(13)

The imaging apparatus according to any one of (1) to (12), in which the control unit causes a warning message to be displayed in a case where an operation for assigning another function different from the moving image capture function to a preset operation unit is performed in a state where the function is set to on.

(14)

The imaging apparatus according to any one of (1) to (13), in which in a case where a partial transfer function to trim and transfer a partial section of the moving image is supported, the control unit causes transmission of flag information indicating that the partial transfer function is supported to an information processing apparatus connected.

(15)

imaging apparatus according to any one of (1) to (14), in which the control unit generates shot mark information indicating a predetermined playback position specified by an operation of a user in the moving image; and the control unit trims a section with a predetermined length including the playback position in the moving image on the basis of the shot mark information to obtain a new moving image.

(16)

The imaging apparatus according to (15), in which the control unit controls transfer of the new moving image to an information processing apparatus connected.

(17)

The imaging apparatus according to (15) or (16), in which the control unit generates the shot mark information in accordance with an operation of the user during capturing of the moving image or during playback of the moving image.

(18)

A control method including:

causing, by an imaging apparatus, recording of moving image capture mode information that indicates a moving image capture mode last used before power-off of the imaging apparatus; and causing, by the imaging apparatus, power-on of the imaging apparatus when a predetermined operation is performed while the imaging apparatus is in a power-off state, and making a setting to the moving image capture mode indicated by the moving image capture mode information upon activation of a function to start capturing a moving image or after termination of capturing of the moving image due to the activation of the function.

(19)

A program for causing a computer that controls an imaging apparatus to execute:

causing recording of moving image capture mode information that indicates a moving image capture mode last used before power-off of the imaging apparatus, and causing power-on of the imaging apparatus when a predetermined operation is performed while the imaging apparatus is in a power-off state, and making a setting to the moving image capture mode indicated by the moving image capture mode information upon activation of a function to start capturing a moving image or after termination of capturing of the moving image due to the activation of the function.

REFERENCE SIGNS LIST

11 Imaging apparatus
24 Mode button

US 12,647,680 B2

45

25 REC button
52 Imaging element
53 Camera signal processing unit
54 Recording control unit
55 Display unit
56 Communication unit
57 Operation unit
58 Camera control unit
59 Memory unit
101 Information processing apparatus
122 Display unit
123 Communication unit
125 Control unit

The invention claimed is:

1. An imaging apparatus, comprising:
a central processing unit (CPU) configured to:
perform a recording operation of moving image capture
mode information, wherein
the moving image capture mode information indi-
cates a first moving image capture mode last used,
for capture of a moving image, before power-off
of the imaging apparatus;
perform power-on of the imaging apparatus based on a
specific operation, wherein
the specific operation is performed in a power-off
state of the imaging apparatus;
set, upon activation of a function to start the capture of
the moving image, a mode for the capture of the
moving image to a blur-priority auto mode;
set, subsequent to termination of the capture of the
moving image due to the activation of the function,
the mode for the capture of the moving image to the
first moving image capture mode; and
switch, based on a first user operation and based on the
capture of the moving image in the blur-priority auto
mode, between the capture of the moving image in
the blur-priority auto mode and the capture of the
moving image at a specific F value.

2. The imaging apparatus according to claim 1, wherein
the CPU is further configured to:
perform a recording operation of power-off mode infor-
mation, wherein
the power-off mode information indicates the first mov-
ing image capture mode among a plurality of image
capture modes, and
the plurality of image capture modes includes a still
image mode and a moving image mode in which the
moving image is captured in at least of a plurality of
moving image capture modes; and
set, subsequent to the termination of the capture of the
moving image due to the activation of the function,
the mode for the capture of the moving image to the
first moving image capture mode indicated by the
power-off mode information.

3. The imaging apparatus according to claim 1, wherein
the CPU is further configured to switch between the
capture of the moving image in the blur-priority auto
mode and the specific F value, based on a toggle
method.

4. The imaging apparatus according to claim 1, wherein
the CPU is further configured to perform, based on a
second user operation at a time at which the moving
image is captured in the blur-priority auto mode, the
capture of the moving image in a specific mode,
the specific mode alternately switches between a first
image capture at a first F value and a second image
capture at a second F value, and

the second F value is larger than the first F value.

5. The imaging apparatus according to claim 1, wherein
an image capture mode, used at a time the moving image
is captured, is among image capture modes that include
a still image mode and a moving image mode in which
the moving image is captured in at least one of a
plurality of moving image capture modes, and
the CPU is further configured to determine, based on the
image capture mode used at the time the moving image
is captured, whether to:
alternately switch, based on a third user operation,
between image capture at a first F value and image
capture at a second F value, wherein
the second F value is larger than the first F value; or
alternately switch, based on the third user operation,
between enable or disable the image capture at the
second F value.

6. The imaging apparatus according to claim 1, wherein
the CPU is further configured to:
perform a recording operation of power-off mode infor-
mation that indicates the first moving image capture
mode last used before the power-off of the imaging
apparatus, wherein
the first moving image capture mode is among a
plurality of image capture modes, and
the plurality of image capture modes includes a still
image mode and a moving image mode in which
the moving image is captured in at least one of a
plurality of moving image capture modes; and
determine, based on the power-off mode information,
the first moving image capture mode upon the acti-
vation of the function.

7. The imaging apparatus according to claim 1, wherein
the CPU is further configured to determine the first
moving image capture mode after the termination of the
capture of the moving image due to the activation of the
function, based on a fourth user operation after the
termination of the capture of the moving image due to
the activation of the function.

8. The imaging apparatus according to claim 1, wherein
the CPU is further configured to control display of a
warning message,
the warning message is displayed based on a fifth user
operation for assignment of a function different from a
moving image capture function, and
the fifth user operation is in a state where the function is
set to on.

9. The imaging apparatus according to claim 1, wherein
the CPU is further configured to cause, in a case where a
partial transfer function to trim and transfer a partial
section of the moving image is supported, transmission
of flag information indicating that the partial transfer
function is supported to an information processing
apparatus.

10. The imaging apparatus according to claim 1, wherein
the CPU is further configured to:
generate shot mark information indicating a playback
position specified by a sixth user operation in the
moving image; and
trim a section with a specific length including the
playback position in the moving image, based on the
shot mark information.

11. The imaging apparatus according to claim 10, wherein
the CPU is further configured to control transfer of a new
moving image to an information processing apparatus.

12. The imaging apparatus according to claim 10, wherein the CPU is further configured to generate the shot mark information, based on the sixth user operation at a time of the capture of the moving image or at a time of playback of the moving image.

13. A control method, comprising:

in an imaging apparatus:

performing recording of moving image capture mode information, wherein the moving image capture mode information indicates a first moving image capture mode last used, for capture of a moving image, before power-off of the imaging apparatus;

performing, power-on of the imaging apparatus based on a specific operation, wherein the specific operation is performed in a power-off state of the imaging apparatus;

setting, upon activation of a function to start the capture of the moving image, a mode for the capture of the moving image to a blur-priority auto mode;

setting, subsequent to termination of the capture of the moving image due to the activation of the function, the mode for the capture of the moving image to the first moving image capture mode; and switching, based on a first user operation and based on the capture of the moving image in the blur-priority auto mode, between the capture of the moving image in the blur-priority auto mode and the capture of the moving image at a specific F value.

14. A non-transitory computer-readable medium having stored thereon, computer-executable instructions which, when executed by a computer in an imaging apparatus, cause the computer to execute operations, the operations comprising:

performing recording of moving image capture mode information, wherein the moving image capture mode information indicates a first moving image capture mode last used, for capture of a moving image, before power-off of the imaging apparatus;

performing, power-on of the imaging apparatus based on a specific operation, wherein the specific operation is performed in a power-off state of the imaging apparatus;

setting, upon activation of a function to start the capture of the moving image, a mode for the capture of the moving image to a blur-priority auto mode;

setting, subsequent to termination of the capture of the moving image due to the activation of the function, the mode for the capture of the moving image to the first moving image capture mode; and switching, based on a first user operation and based on the capture of the moving image in the blur-priority auto mode, between the capture of the moving image in the blur-priority auto mode and the capture of the moving image at a specific F value.

* * * * *